US009901844B2

(12) United States Patent
Calero

(10) Patent No.: US 9,901,844 B2
(45) Date of Patent: Feb. 27, 2018

(54) NANO SEEDING TOOLS TO GENERATE NANOMETER SIZE CRYSTALLIZATION SEEDS

(71) Applicant: University of Pittsburgh—Of the Commonwealth System of Higher Education, Pittsburgh, PA (US)

(72) Inventor: Guillermo A. Calero, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 439 days.

(21) Appl. No.: 14/640,805

(22) Filed: Mar. 6, 2015

(65) Prior Publication Data

US 2015/0251106 A1 Sep. 10, 2015

Related U.S. Application Data

(60) Provisional application No. 61/949,836, filed on Mar. 7, 2014.

(51) Int. Cl.
*B01D 9/00* (2006.01)
(52) U.S. Cl.
CPC .......... *B01D 9/0077* (2013.01); *B01D 9/0036* (2013.01); *B01D 2009/0086* (2013.01)
(58) Field of Classification Search
CPC ........ B01F 3/12; B01F 3/1207; B01F 3/1214; B01F 3/18; B01F 3/2276; B01F 2003/0042; B01D 9/0036; B01D 9/005; B01D 9/0077; B01D 2009/0086; C02F 2001/5218; C30B 29/54; C30B 29/58
See application file for complete search history.

(56) References Cited

U.S. PATENT DOCUMENTS

| 6,296,673 B1* | 10/2001 | Santarsiero | B01J 19/0046 23/295 R |
| 2003/0048341 A1* | 3/2003 | Mutz | B01J 19/0046 506/12 |
| 2004/0069211 A1* | 4/2004 | Boily | C30B 1/12 117/30 |
| 2004/0115731 A1* | 6/2004 | Hansen | B01J 19/0046 506/12 |

(Continued)

OTHER PUBLICATIONS

Luft et al., A method to produce microseed stock for use in the crystallization of biological macromolecules, 1999, Acta Cryst., D55, pp. 988-993.*

(Continued)

*Primary Examiner* — David C Mellon
(74) *Attorney, Agent, or Firm* — Klarquist Sparkman, LLP

(57) ABSTRACT

A kit and a method for using the kit to generate nanoseeds from protein nanocrystals and aggregates is disclosed. The method comprises mixing a plurality of beads with a protein nanocrystal or aggregate, and agitating the mixture to generate the nanoseeds. Nanoseeds made by disclosed embodiments may be of a high quality, as evaluated by TEM, and can be used to produce high quality protein crystals. Additionally, spectroscopic techniques, such as UV fluorescence and/or brightfield microscopy can be used to identify aggregates suitable to produce nanoseeds.

18 Claims, 32 Drawing Sheets

(56) References Cited

U.S. PATENT DOCUMENTS

2006/0257485 A1* 11/2006 Kumacheva ........... B82Y 30/00
424/486
2009/0155815 A1* 6/2009 Grasberger ............. C30B 29/58
435/7.8

OTHER PUBLICATIONS

D'Arcy et al., An automated microseed matrix-screening method for protein crystallization, 2007, Acta Crystallographica Section D, 63, pp. 550-554.*
https://hamptonresearch.com/documents/product/hr005780_2-320_seed_bead-11.12.pdf (downloaded Apr. 7, 2015).
Stevenson et al., "Use of transmission electron microscopy to identify nanocrystals of challenging protein targets," *Proceedings of the National Academy of Sciences* 11(23):8470-8475, Jun. 10, 2014.

* cited by examiner

| Screen | Protein | Clear Drops | Granular Aggregates | Phase Separation | Denatured Protein |
|---|---|---|---|---|---|
| HR Crystal Screen 2 | PTHR1 | 35% | 46% | 4% | 7% |
| HR SaltRX | Pol II Complex | 52% | 41% | 0% | 7% |
| HR PEG Suite II | Pol II Complex | 42% | 46% | 8% | 4% |

NANO SEEDING TOOLS TO GENERATE NANOMETER SIZE CRYSTALLIZATION SEEDS

CROSS REFERENCE TO RELATED APPLICATION

This application claims the benefit of the earlier filing date of U.S. provisional patent application No. 61/949,836, filed Mar. 7, 2014, which is incorporated herein by reference in its entirety.

BACKGROUND

X-ray Crystallography experiments remain the most successful method to obtain structural information from biological targets, comprising 85737 structures out of 97180 (88%) deposited as of Jan. 21, 2014 in the protein database entries. Advances in molecular biology and biochemical techniques have allowed expression and purification of a significant number of new protein targets including human and pharmacological relevant proteins. Similarly, innovations in synchrotron science including development of micro-focused X-ray beams and advances in detector technologies as well as development of user-friendly crystallography software packages have expedited crystal-to-structure time frames. However, notwithstanding the abundance of targets or the increasingly faster crystal-to-structure pipeline, crystallization of protein targets remains the most significant bottleneck in structure determination by X-ray crystallography and continues to have significant negative impact in the field.

SUMMARY

Microseeding is a conventional crystallization technique that uses microseeds from a nucleation step to facilitate growth of crystals in other conditions.

Disclosed herein are embodiments of a method for generating nanoseeds from protein nanocrystals. In some embodiments the method comprises contacting a plurality of beads with an aggregate comprising at least one first protein nanocrystal to form a mixture, and agitating the mixture to produce a nanoseed. The aggregate may be a granular aggregate. In some embodiments the aggregate is contained within a crystallization drop, and in some examples, the beads are contacted with the aggregate in a microcentrifuge tube.

In some embodiments each bead independently has a bead size of less than 5 mm, and in certain embodiments the bead size is selected from 0.1 mm, 0.5 mm, 1 mm or a combination thereof. In some embodiments the plurality of beads is from 2 to 1000 beads, such as from 2 to 100 beads, 5 to 30 beads or 8 to 10 beads. In other embodiments, the plurality of beads has a weight of from 10 mgs to 50 mgs. In working embodiments the beads are glass beads or stainless steel beads, or a combination thereof.

In some embodiments the agitation comprises vortexing the mixture, shaking the mixture, stirring the mixture or any combination thereof. The agitation may be for a time of from greater than 0 seconds to 30 seconds, such as from 5 seconds to 15 seconds.

In certain embodiments the method further comprises selecting the aggregate by brightfield microscopy, screening the aggregate by ultraviolet tryptophan fluorescence, generating a second protein nanocrystal from the nanoseed, or any combination thereof.

The method may comprise selecting plurality of aggregates by brightfield microscopy, contacting the plurality of aggregates with a plurality of beads having a diameter of from 0.1 mm to 1 mm, to form a mixture, and agitating the mixture for from 5 second to 15 seconds to form a plurality of substantially homogeneous nanoseeds.

Also disclosed herein are embodiments of a kit comprising a microcentrifuge tube and from 7 to 25 beads, each bead independently having a bead size from 0.1 mm to 1 mm. The beads may be glass beads, stainless steel beads or a combination thereof.

The foregoing will become more apparent from the following detailed description, which proceeds with reference to the accompanying figures.

BRIEF DESCRIPTION OF THE DRAWINGS

FIG. 2 provides a table indicating the occurrences of clear drops, granular aggregates, phase separation and denatured protein during conventional crystallization experiments for the parathyroid hormone receptor (PTHR1) (3 mg/ml) and RNA polymerase II-transcription factor IIB (TFIIB) complex (RPB1I-TFIIB) (8 mg/ml).

FIG. 18 provides a table listing the proteins used in nanocrystallography screening, including the SDS-PAGE gel showing the final purified protein, the full name of the protein, expression system and protein yields and protein concentrations used for setting up trays.

DETAILED DESCRIPTION

Figure 1:
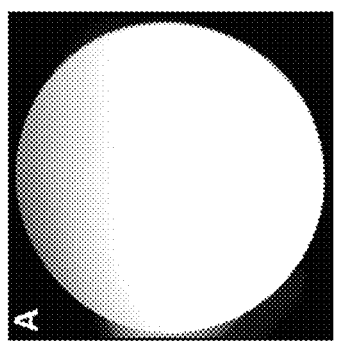
FIG. 1 provides representative brightfield microscopy images of A) clear drops, B) granular aggregates and C) denatured protein regularly observed during the process of protein crystallization.
Figure 1:
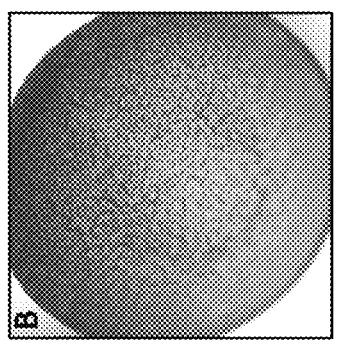
Figure 1:
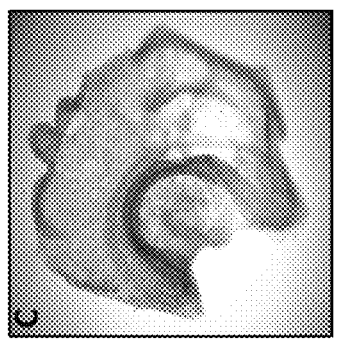

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

I. Overview

X-ray Crystallography experiments remain the most successful method to obtain structural information from biological targets. However, crystallization of protein targets remains the most significant bottleneck in structure determination by X-ray crystallography. Despite the significant advances in sample modifications to enhance the crystallizability of challenging targets, including novel efforts in protein crystallization involving target manipulations such as alanine-scanning mutagenesis, thermo-stabilization, chimeric proteins favoring crystal contacts or stabilizing Fab and nano-bodies the challenges persist.

In addition to these developments in target manipulation, seeding is a long-standing optimization tool in the crystallographer's arsenal. This technique is utilized in several ways. Macroseeding is a technique that traditionally refers to the process of transferring a small crystals or crystal fragments into a series of stabilizing wash solutions. After washing, the small crystal is transferred into a pre-equilibrated drop in order to grow the crystal larger. Alternatively, microseeding involves removing crystals from a drop, transferring them into a stabilizing solution and then crushing them and performing a dilution series of the crushed crystal seeds. Seed solutions are then introduced into new drops using a probe in the hopes of growing larger or more ordered crystals. In both instances the aim is to take microcrystals or fragments from larger crystals and seed them into a meta-stable supersaturated protein drop to provide nucleation sites while controlling growth.

Microseed matrix screening (MMS) is becoming a more popular technique due to its adaptability to robot crystallization tray setups. MMS is performed by pooling crystals that appear after traditional crystallographic screening. Pool crystals are homogenized and resultant seeds added to a new set of screening experiments. However, this technique requires pre-formed well-identified crystals. The challenge is to adequately separate useful seeds from those that will have a deleterious effect on attempts to obtain higher quality crystals or are simply from a salt source that is indistinguishable from protein. Furthermore, this technique relies on poorly diffracting crystals—which does not take advantage of precipitates that could otherwise be optimized into larger crystals.

Disclosed herein are embodiments of a method using sub-millimeter sized glass beads of varying sizes to grind EM-visualized nano-crystals (NCs) from crystallization drops and quantify their size and lattice quality using electron microscopy experiments, such as transmission electron microscopy (TEM). TEM has demonstrated that, surprisingly, nanometer sized crystals (nano-crystals, NCs) are frequently observed in most crystallization experiments.

Crystallization of protein samples using commercially available screens typically yields a spectrum of morphologies including: 1) clear drops (FIG. 1A); 2) drops with granular aggregates (which can be amorphous or comprised of well-differentiated individual particles) (FIG. 1B); 3) drops with large solid aggregates (probably associated with sample denaturation) (FIG. 1C); and 4) drops with phase separation. Such morphologies depend on the protein sample and the chemical nature of the precipitant (FIG. 2). Previously, these were all regarded as unusable for crystallography, as high quality crystals could not be grown from them. However, surprisingly, as disclosed herein, the solid aggregates have been found to contain nanocrystals which, when suitably crushed, can act as nanoseeds capable of producing high quality protein crystals.

II. Kits

Disclosed herein are embodiments of a kit to generate nanometer sized crystallization seeds. The kit comprises a container, such as a tube or flask, and from at least 2 beads to greater than 1000 beads, such as from 2 to 500 beads, from 2 to 100 beads, from 2 to 50 beads, from 5 to 30 beads, from 7 to 12 beads, from 18 to 30 beads, or from 23 to 27 beads. In some embodiments, the kit comprises a microcentrifuge tube and from at least 2 beads to greater than 50 beads, such as from 5 beads to 30 beads, from 7 to 12 beads, or from 22-27 beads. The microcentrifuge tube can be of any suitable size, such as from 0.5 mL to 2 mL, preferably about 1.5 mL. The beads may be formed from any suitable material, such as glass, metal or metal alloy, ceramic or PTFE. In certain embodiments the beads are glass or stainless steel. The beads may be of any size suitable to be effective to make seed crystals. The size is from 0.05 mm to 1.5 mm, preferably from 0.1 mm to 1 mm. In certain embodiments the bead size is selected from 0.1 mm, 0.5 mm or 1 mm. In some embodiments the kit comprises beads of the same size, but in other embodiments the beads have a mixture of sizes.

In particular embodiments the kit comprises 7 or 25 glass beads, with bead sizes selected from 0.1 mm, 0.5 mm, 1 mm, or any combination thereof. In other particular embodiments the kit comprises 7 or 25 stainless steel beads with bead sizes selected from 0.5 mm, 1 mm, or any combination thereof.

In any of the above embodiments the crystal or crystals used to generate the seed crystal is a nanocrystal, a conventional crystal or a combination thereof.

III. Method of Using the Kit

Also disclosed is a method of using the kit to generate seed crystals. A general method of using the kit comprises contacting a plurality of beads with an aggregate that comprises at least one protein nanocrystal to form a mixture, and agitating the mixture to produce a nanoseed. The method may further comprise generating a new, high quality protein nanocrystal from the nanoseed. In some embodiments the mixture is prepared in a microcentrifuge tube. Any suitable method of agitation can be used, such as vortexing, shaking, or stirring. In certain embodiments the vortexing is the method of agitation. The mixture is agitated for an effective amount of time to crush the crystal to a desired size. In some embodiments the effective amount of time is from greater than zero seconds to greater than 60 seconds, typically from greater than zero seconds to 30 seconds, more typically from 5 seconds to 15 seconds. In particular working embodiments, the effective amount of time was 5 seconds, and in other working embodiments, it was 10 seconds. In certain embodiments the agitation is performed more than once, such as twice, three times, four times, five times or more. In particular working embodiments, the mixture was vortexed twice. In some embodiments the method further comprises removing the beads after crushing the crystal.

In certain embodiments the beads are glass, and in other embodiments the beads are a magnetic material, such as stainless steel, for easy removal with the use of a magnet applied to the side of the tube. Typically, each bead has a bead size of less than 5 mm, such as from 0.1 mm to 3 mm, or from 0.1 mm to 1 mm, and in some embodiments the bead size of each bead is selected from 0.1 mm, 0.5 mm, 1 mm or a combination thereof. A person of ordinary skill in the art will appreciate that the number of beads used will vary depending on the sample volume, with larger sample volumes typically requiring larger numbers of beads. In some embodiments, the plurality of beads is from 2 to 1000 beads, such as from 2 to 500 beads, from 2 to 100 beads, from 2 to 50 beads, from 5 to 30 beads, from 7 to 12 beads, from 18 to 30 beads, or from 23 to 27 beads. In other embodiments, the plurality of beads is selected by weight, such as from 5 to 2000 mgs, from 5 to 1000 mgs, from 10 to 500 mgs, from 10 to 100 mgs, from 10 mgs to 50 mgs, from 20 mgs to 40 mgs, or from 25 mgs to 30 mgs of beads.

In some embodiments, the size of the nano-seeds can be selected by selecting the size, number of the beads and/or agitation time. Typically, fewer beads and/or larger beads lead to larger nano-seeds, and a greater number of beads and/or smaller beads results in smaller nano-seeds. Also, a shorter agitation time leads to larger nano-seeds and a longer agitation time leads to smaller nano-seeds.

In certain embodiments the aggregate is contained within a crystallization drop. In certain examples, the aggregate is a granular aggregate. In some examples, crystalline material from a plurality of crystallization drops is used, such as from 2 to 10 drops, or from 2-5 drops. This may result in a plurality of crystals or aggregates being used, such as from 2 to 100, from 20 to 80, or from 30-50 crystals or aggregates.

Optionally, microscopy techniques are used to identify aggregates or precipitates for screening. Typical microscopy techniques include brightfield microscopy, ultraviolet (UV) microscopy such as UV tryptophan fluorescent microscopy, and/or TEM. UV positive samples undergo visualization by TEM as described in the working examples. Optionally, samples that contain protein nanocrystals are then subjected to at least one round of optimization. The optimization experiments are performed as traditional larger crystallization experiments. The optimization experiments can include any suitable techniques known to a person of ordinary skill in the art, such as improvements in crystal size and/or quality upon treatment with PEG, changes in salt or protein concentrations and the like. The optimization may have more than one purpose, such as improving nano-crystal size, improving nano-crystal quality or generating an increased number of nanocrystals for seeding experiments, or any combination thereof.

After optimization, individual crystallization drops containing NCs are diluted with mother liquor, from a 2-fold to an 8-fold dilution, typically a 4-fold dilution. These diluted samples are mixed with beads in microcentrifuge tubes. Typically, 5 to 30 beads are mixed with the drops, or alternatively, 20 mgs of beads to 50 mgs of beads, typically 35 mgs of beads were used. After mixing, the samples are agitated to make nanoseeds.

Figure 3:
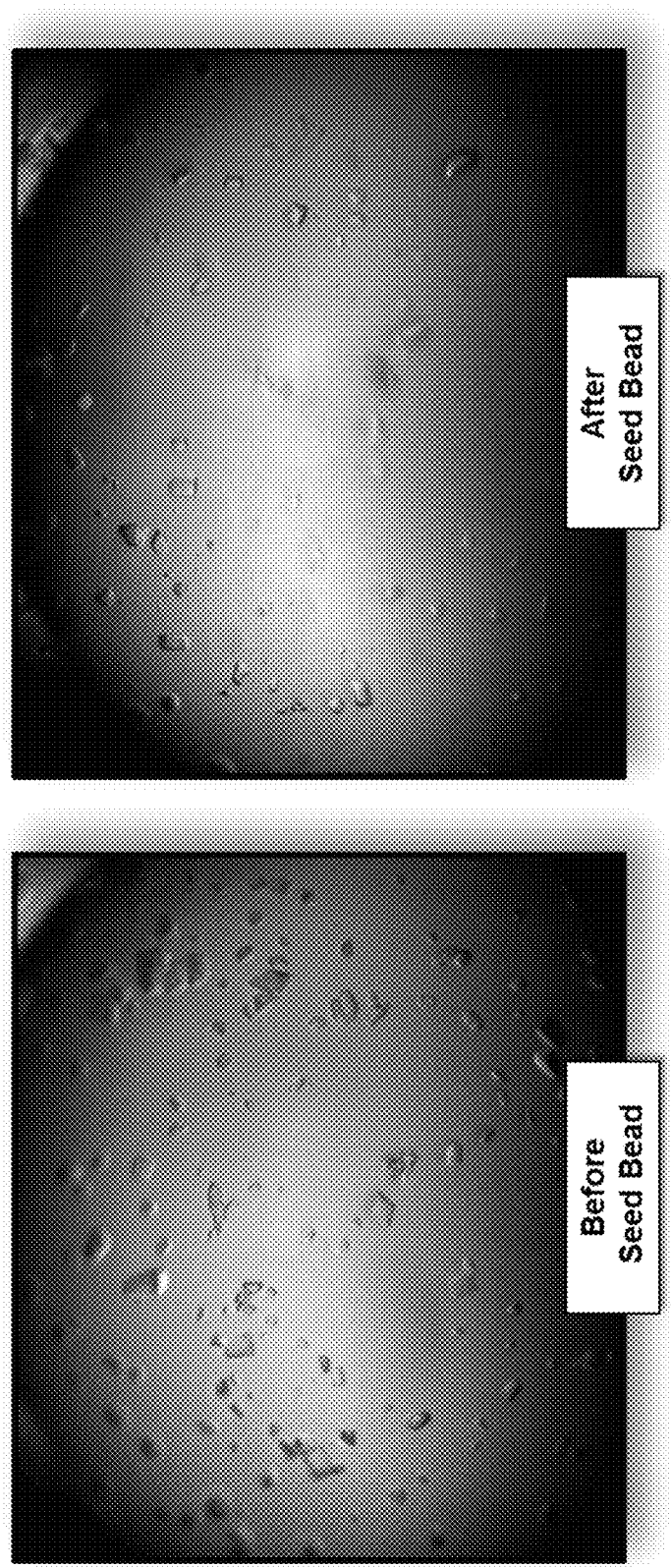
FIG. 3 provides before and after images of thick crystals processed using existing available seed bead kits.
Figure 8:
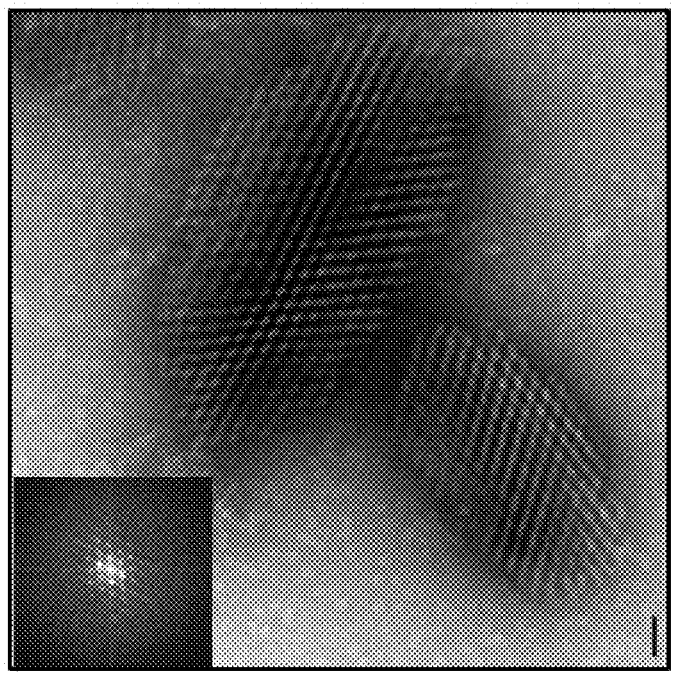
FIG. 8 provides a TEM image of crystals of various sizes produced by the 0.5 mm beads.
Figure 9:
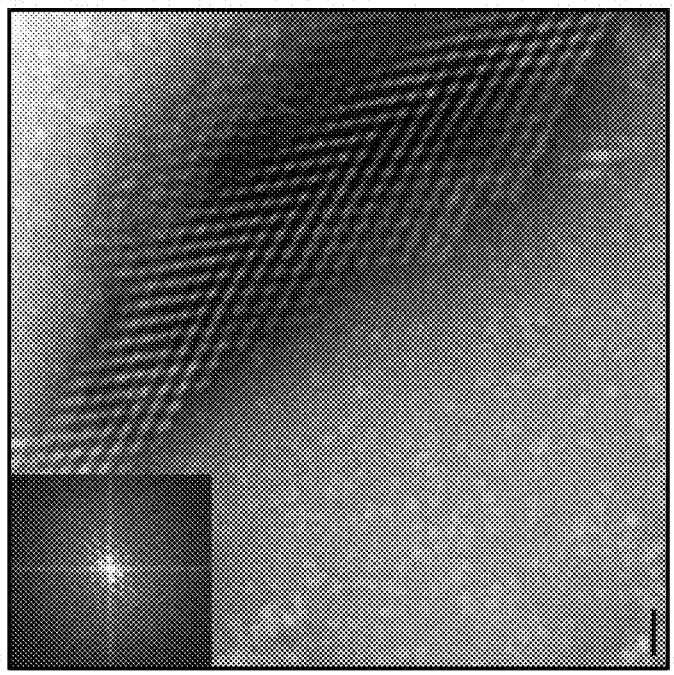
FIG. 9 provides a TEM image of a crystal produced by using the 0.5 mm beads, clearly showing the fracture lines of the lattice.
Figure 10:
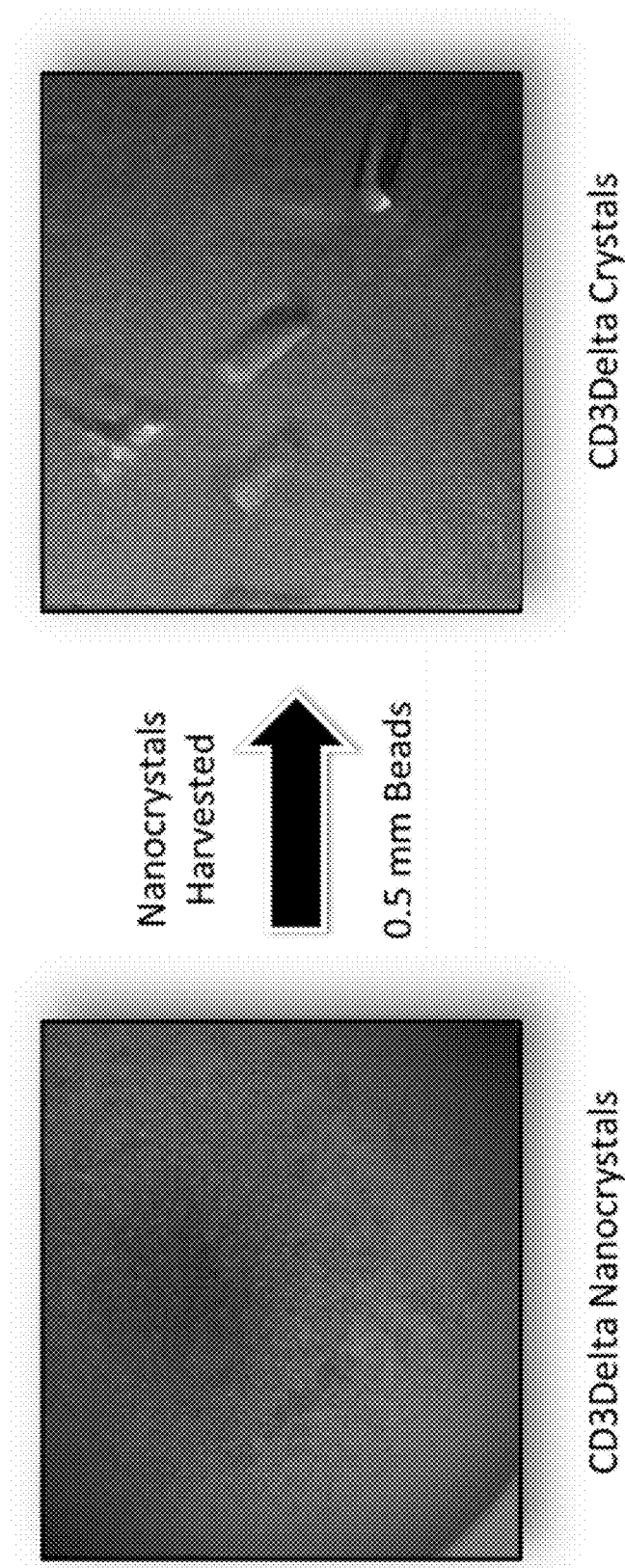
FIG. 10 provides images of CD3Delta nanocrystals and resulting CD3Delta crystals, grown from seed crystals generated from the nanocrystals using 0.5 mm seed beads.

As can be seen in FIG. 3, when seed crystals are generated from nanocrystals, the conventional 5 mm PTFE bead does not effectively grind the nanocrystals into smaller seed crystals. When the smaller beads disclosed herein are used, the nanocrystals are crushed successfully into high quality seed crystals with near uniform size (FIGS. 4-9). Although these seed crystals are small, they are able to successfully seed large crystal growth (FIG. 10).

Therefore, disclosed herein is a useful methodology to generate nano-seeds from nanocrystal slurries and/or aggregates, and corroborated their high quality using negative-stain electron microscopy. Different size seed beads can be used to produce different sized seeds, and this may have consequences on the growth of crystals by streak microseeding experiments. Nanoseeds are visualized directly by TEM. In all instances examined, nanoseeds produced by 0.5 mm beads are of high quality, as indicated of the evaluation of the FFT of the lattice. Use of such nanoseeds are extraordinary in four applications: 1) to produce improvements in crystal quality that cannot be obtained through crystal condition optimization or traditional seeding. This is corroborated by X-ray diffraction data. 2) Nanoseeding, using nanocrystals not visible by brightfield microscopy, only identifiable by TEM, can be used in seeding experiments to produce visible crystals useful for traditional X-ray crystallography. 3) To produce higher quality nanocrystals, as in traditional seeding results, improvements of which are observed by TEM. 4) To produce homogeneous populations of crystals whose size to can be tailored by varying protein: precipitant ratio (heretofore referred as crystal catalogues). In order to generate crystal catalogues, crystal drops are seeded with equal amounts of nano-seeds from a seeding stock using a 0.3-0.4 millimeter cryo-loops (Hampton Research). Typical sizes of crystal catalogues can range from 0.5 micrometers to 300 micrometers or more. Only seeded drops generate crystal catalogues, such growth patterns are absent for non-seeded drops. Crystal catalogues are a highly desirable application to be used at new synchrotron facilities that use an X-ray free electron laser.

These results have not only important and useful applications for traditional and nanocrystallography, but also serve as a probe into the workings of seeding, a technique which though powerful not much is known about what is occurring during the process.

IV. Working Examples

Example 1

Conventional crystallization experiments using commercially available crystallization screens (crystal screen I and II, HR) were performed on three samples including two protein targets that did not yield diffraction size crystals and a previously crystallized target as a control to evaluate the quality of crystals obtained with nano-seeds (FIG. 2). Brightfield microscopy was used to detect the presence of NC in selected crystallization drops. Detected granular aggregates or distinct precipitate were then screened by ultraviolet (UV) tryptophan fluorescent microscopy. UV positive samples underwent visualization by TEM as described below. Crystallization conditions bearing NCs were subject to one round of optimization. These optimization experiments were performed as traditional, larger crystallization experiments: testing for improvements in crystal size and quality that appear in response to modifications in conditions such as PEG, salt and protein concentration.

Figure 4:
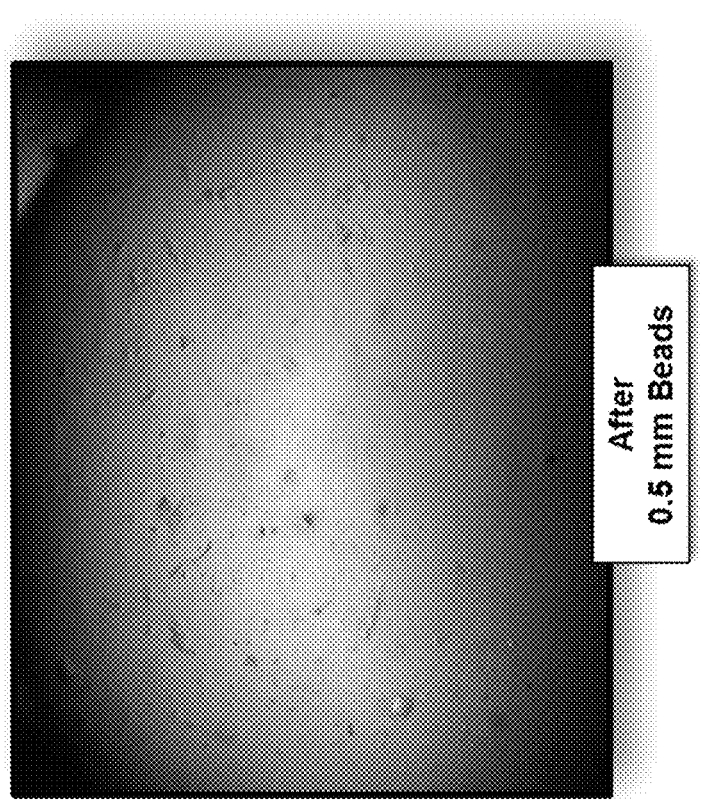
FIG. 4 provides before and after images of thick crystals processed using 0.5 mm beads.
Figure 4:
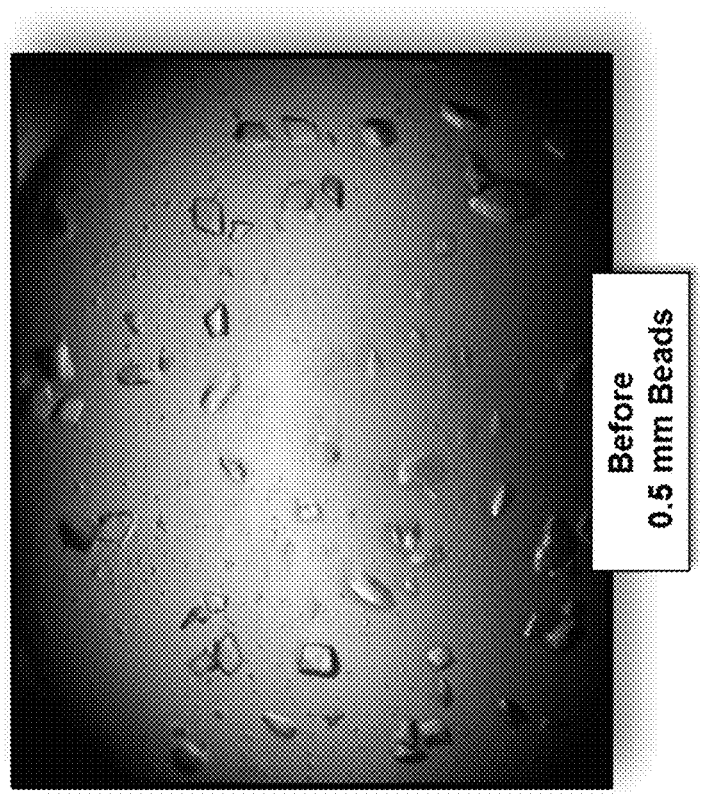
Figure 5:
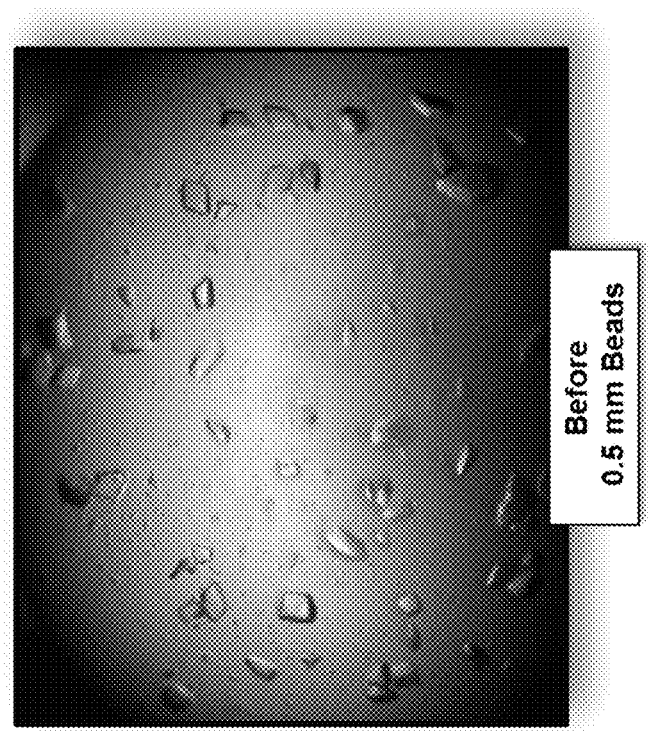
FIG. 5 provides a UV microscope image of seed crystals with near uniform size, generated from thick nanocrystals using 0.5 mm beads.
Figure 5:
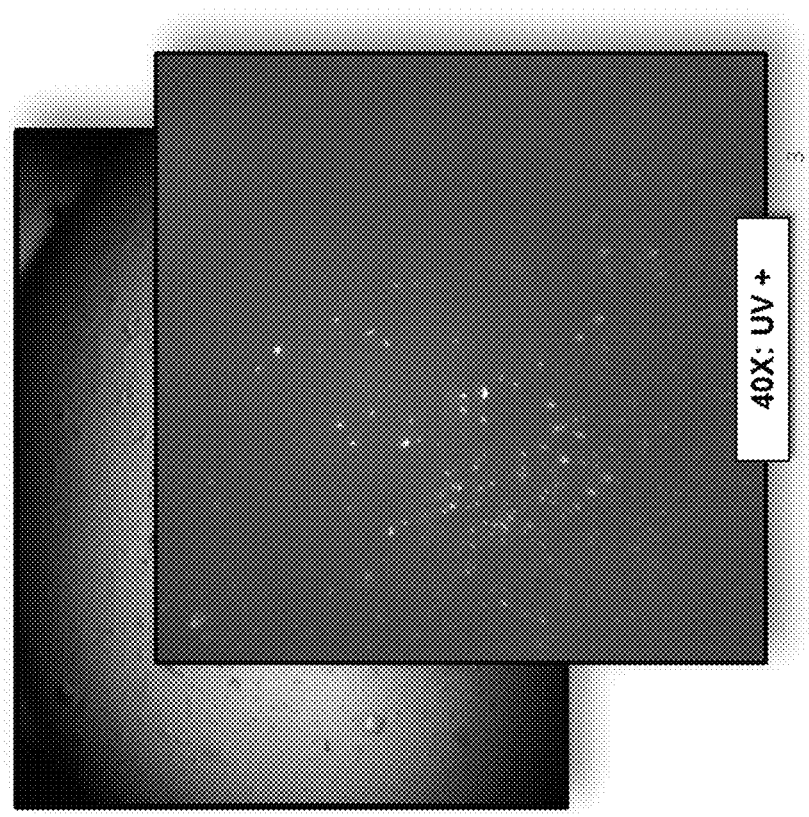
Figure 6:
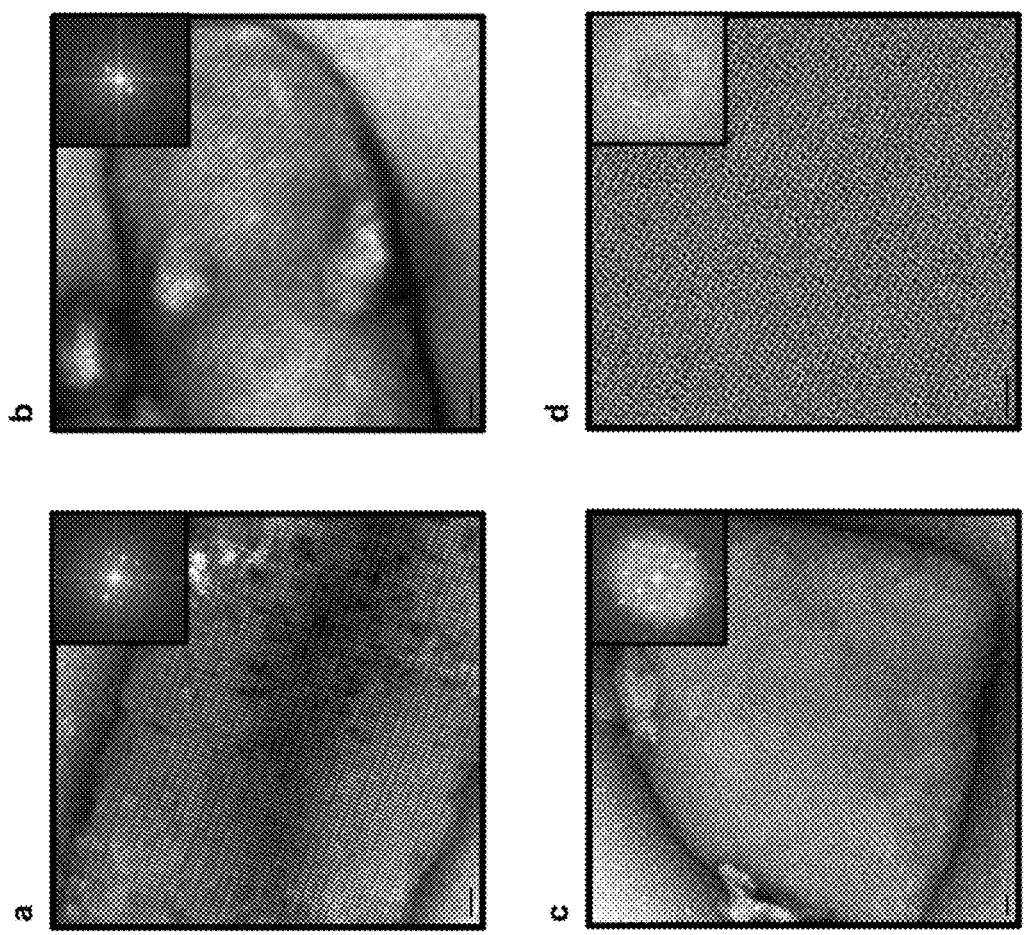
FIG. 6 provides additional TEM images of nano seed crystals generated using 0.5 mm glass beads.
Figure 11:
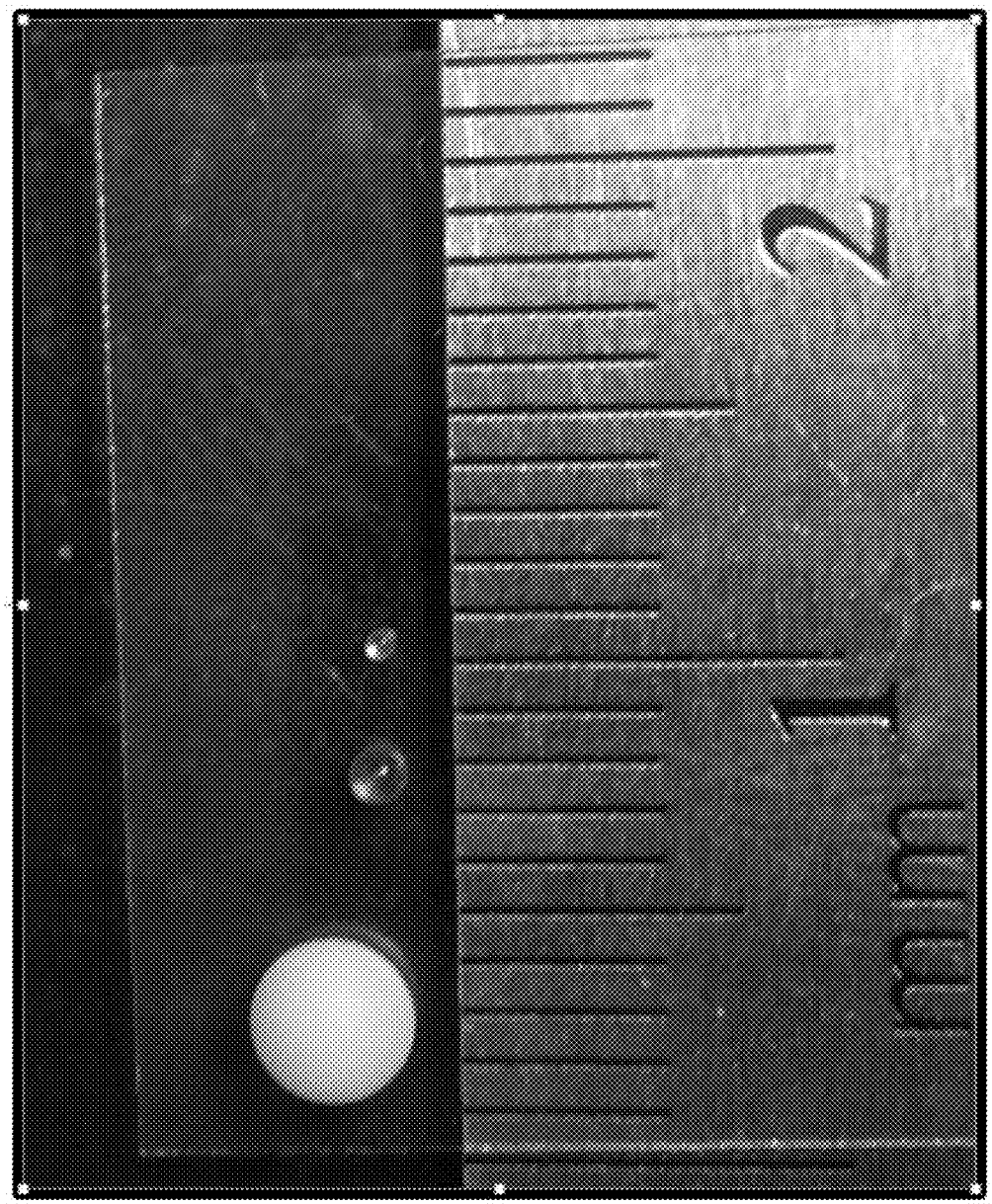
FIG. 11 provides an image illustrating the size differences between different beads.

After the initial round of optimization, individual crystallization drops containing NCs were diluted 4-fold with mother liquor and loaded into 500 mL microcentrifuge tubes containing 35 mg of 0.5 mm glass-beads (research Products International Corp., RPI) or 1 Hampton Research (HR) seed bead in a 1.5 mL microcentrifuge tube (FIG. 11). Samples were twice vortexed for 30 seconds and kept on ice until further use. Brightfield evaluation of the crushed crystals by the HR Teflon seed bead (FIG. 3) compared to 0.5 mm beads shows significantly more fragmentation by the 0.5 mm beads (FIG. 4). The seeds produced by the HR bead were too thick to be useful for lattice visualization by TEM. However, those crushed with 0.5 mm beads were excellent candidates for the identification and evaluation of lattices (FIGS. 7-9 and FIG. 12).

Figure 7:
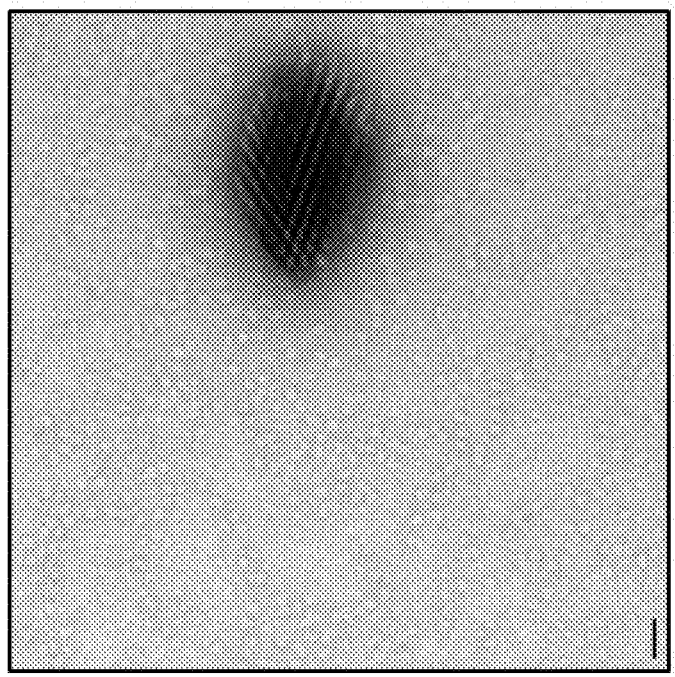
FIG. 7 provides a TEM image of a crystal crushed by 0.5 mm beads.
Figure 12:
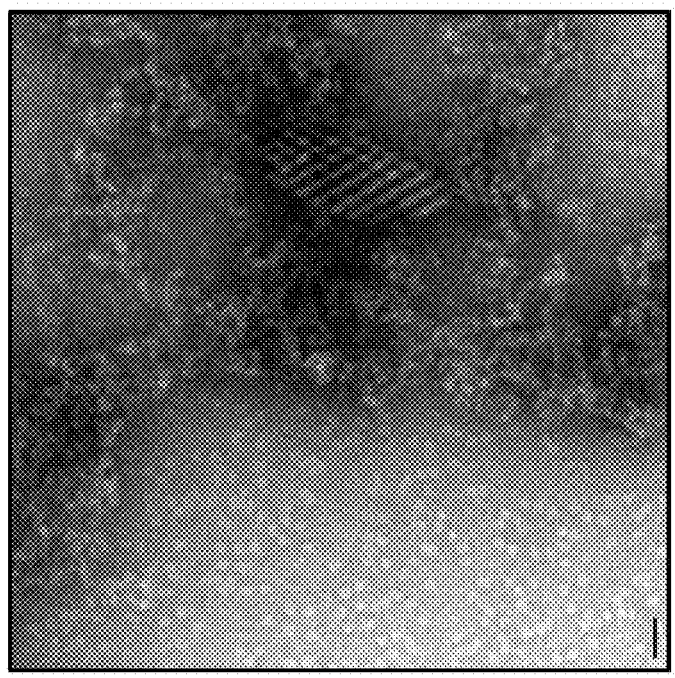
FIG. 12 provides a TEM image of a crystal embedded in a protein filament.
Figure 13:
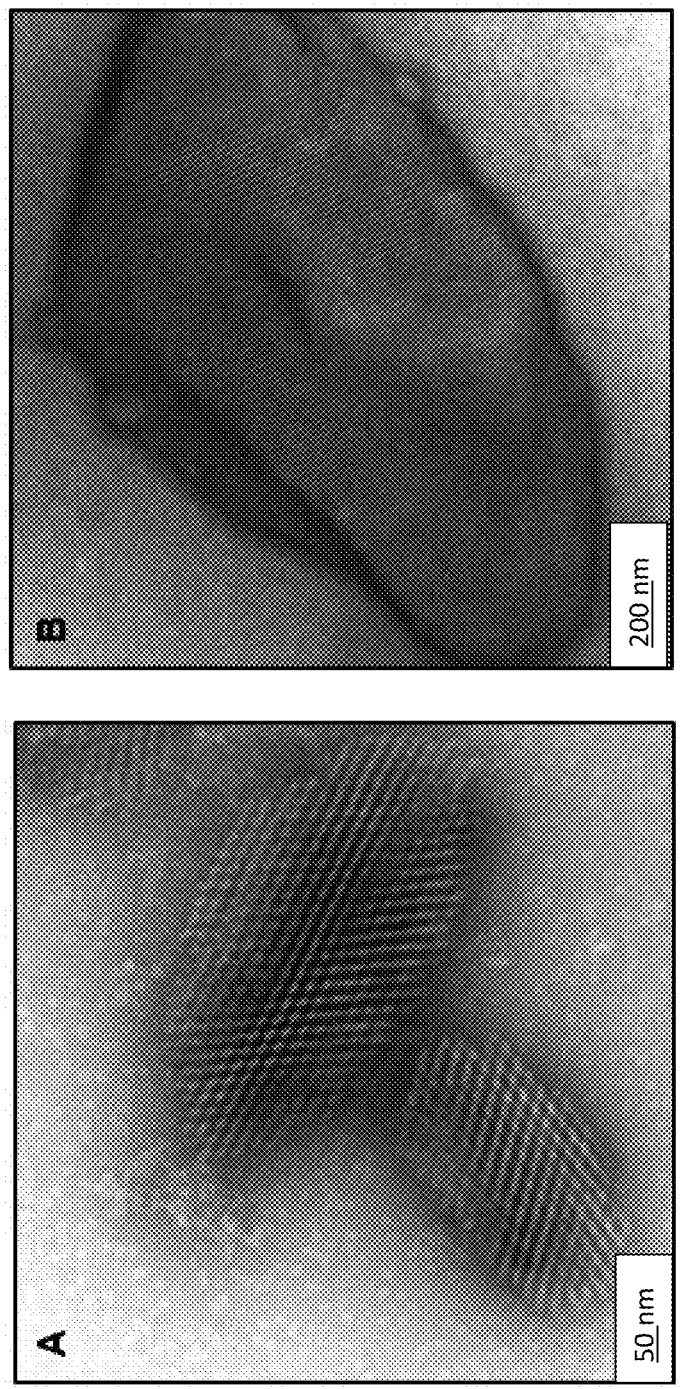
FIG. 13 provides TEM images of different size beads produced by using 0.1 mm beads.

Nanoseeds containing samples were loaded onto carbon film copper grids (Electron Microscopy Sciences), blotted, negatively stained with 2% uranyl acetate for 2×30 second incubations and dried. Sample grids were visualized using a T12 Tecnai electron microscope. As the example of crushed Pol II-GFP crystals with 0.5 mm beads shows in FIGS. 7-9 and FIG. 12, lattices generated by 0.5 mm beads allow for the distinction of seed features, previously unidentifiable by brightfield microscopy. FIG. 7 and FIG. 8 show examples of seeds crushed to various sizes. The size of the seeds generated could also be controlled by using the slightly larger 1.0 mm beads (FIG. 13). In FIG. 9 fracture lines of the lattice is clearly evident. An example which gives insight into the composition of a seed solution is found in FIG. 12, in which a seed is embedded in protein filaments, while free Polymerase particles are also present due to their large size (FIG. 12).

Figure 14:
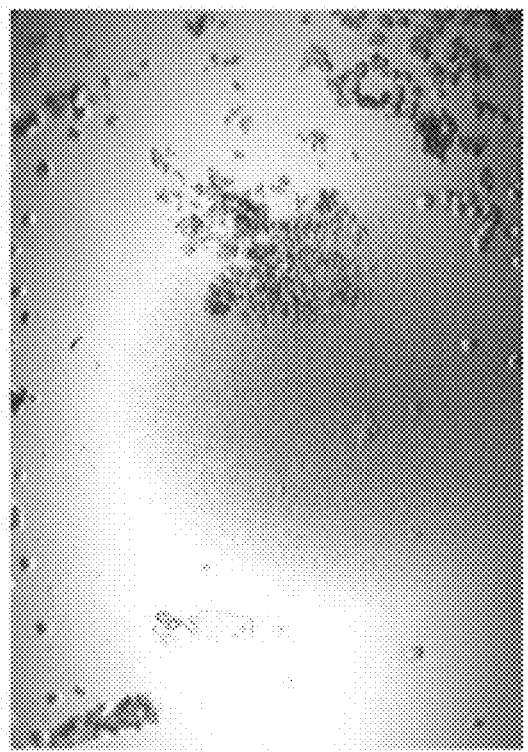
FIG. 14 provides an image of the results of a micro seeding experiment performed with seed crystals generated by a 5 mm Teflon bead.
Figure 15:
FIG. 15 provides an image of the results of a micro seeding experiment performed with seed crystals generated by the 0.5 mm beads, illustrating the higher quality and larger size of the crystals compared to those in FIG. 14.

In addition to comparing the shearing capacity of the Teflon beads versus the 0.5 mm beads by brightfield and TEM, experiments comparing the results of streak microseeding experiments, from the same source of crystals were performed. Pol II-GFP low quality crystals were crushed by the Teflon and 0.5 mm beads. As shown in FIG. 14 and FIG. 15, significantly higher quality and larger size crystals were obtained from the 0.5 mm beads compared to the Teflon bead.

Figure 16:
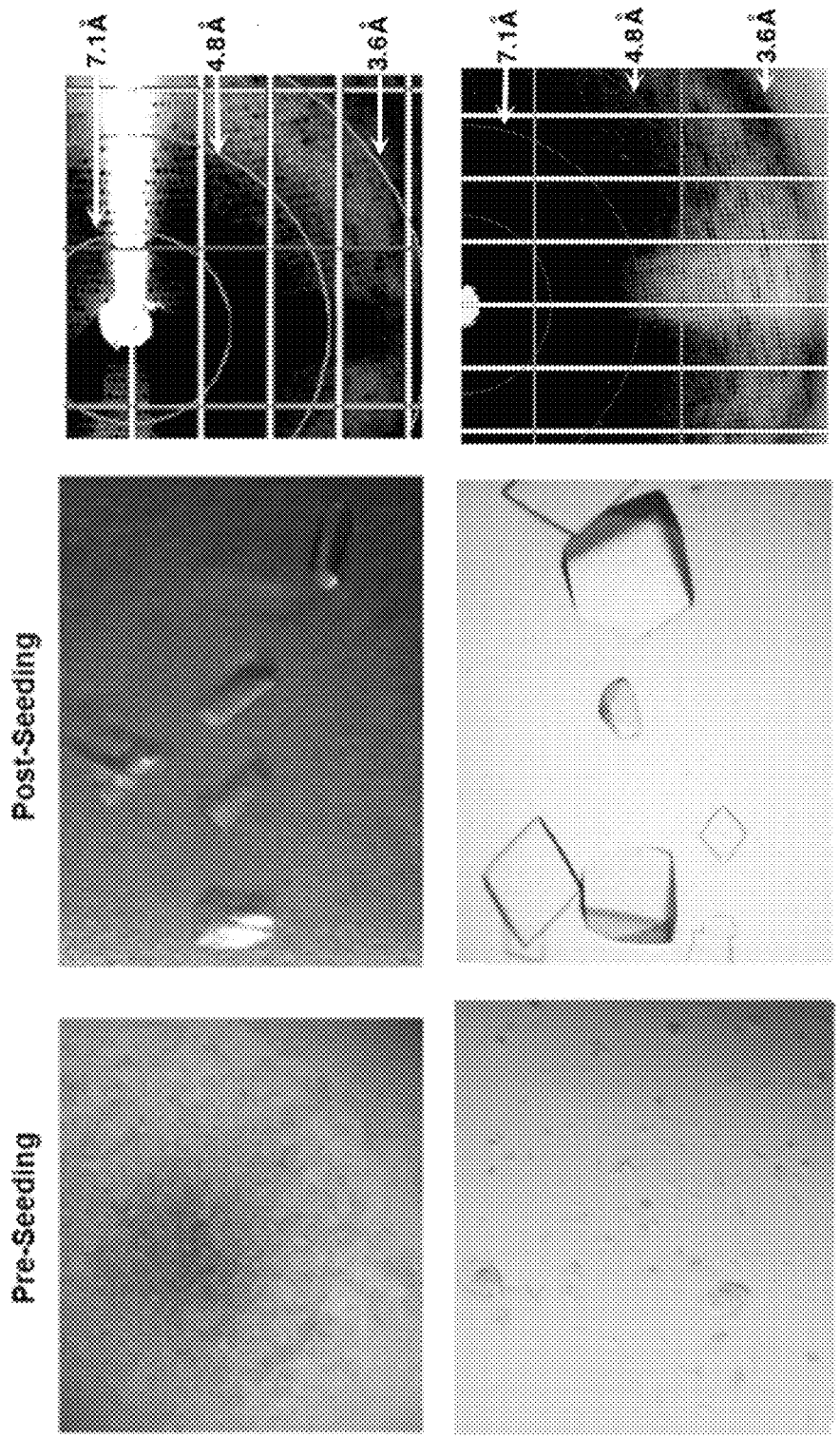
FIG. 16 provides images and results from an X-ray diffraction experiment from separate experiments illustrating the quality and size of crystals grown from seed crystals generated using the 0.5 mm beads.
Figure 17:
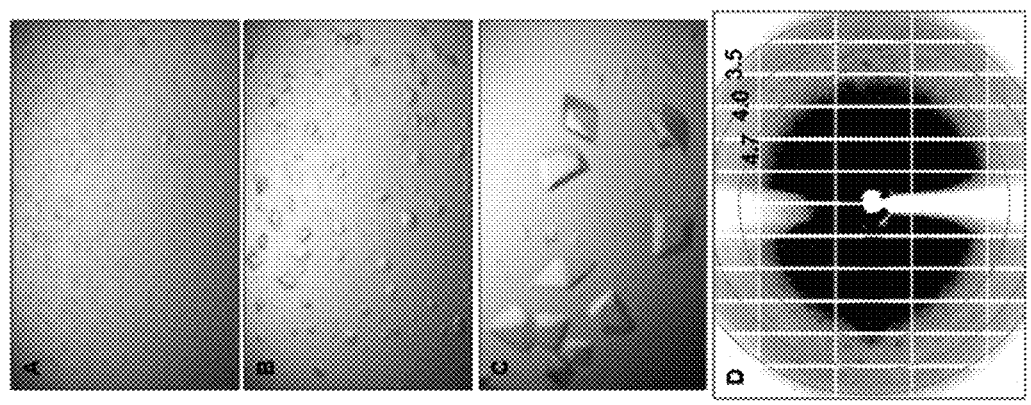
FIG. 17 provides images and results from an X-ray diffraction experiment illustrating the overall improvement in resolution of protein crystals grown from seed crystals generated by using the 0.5 mm beads.

Based on the high quality crystals produced from 0.5 mm generated seeds a series of microseeding experiments were performed using TEM-validated high quality "nanoseeds"—those generated from 0.5 mm beads—for seeding experiments. Nanoseed slurries were prepared as described herein and deposited on crystallization drops using a 0.3 to 0.4 millimeter cryo-loops (Hampton Research). Nanoseeded crystal drops generated high quality crystals for all targets selected (FIG. 16). X-ray diffraction experiments showed overall improvement of resolution and crystal mosaicity (FIG. 17).

Since all samples in our study yielded large crystals by nanoseeding methods, after initial TEM experiments confirmed the quality of crystal lattices, lysis efficiency, homogeneity and concentration can be evaluated by placing two micro-liters of sample between cover-slides UV-microscopy inspection.

Electron Microscopy 400 square mesh copper grids with carbon film (Electron Microscopy Sciences) were freshly glow discharged for 1 minute, 25 mVs (EmiTech) at atmospheric conditions before incubation with samples. Selected samples were applied to grids by two methods depending on the concentration of nanoparticles. When sufficiently high concentration of particles were present (when a sample contains densely visible particles which give good intensity by DLS above 1.25 intensity autocorrelation) 5-8 µL of sample were applied and incubated for 30 seconds on a grid before blotting and staining with 2% uranyl acetate. Low density samples were applied to grid by placing a drop of the sample in a parafilm lined petri dish along with at least 300 µL of mother liquor from the sample's origin in close proximity to the sample drop. A grid was put on top of the drop of sample, carbon side down, and the petri dish was sealed and sample was allowed to incubate for 10-60 minutes before staining with uranyl acetate. EM images were acquired using a FEI Tecnai T12 microscope operating under 120 kV using a single tilt specimen holders. Images were collected onto a 2 k×2 k charge coupled device camera using the User Interface (for EM control and operation).

Example 2

Example Application Using a Disclosed Kit

Background

X-ray crystallography is the primary technique used to obtain high-resolution structures of proteins. This method relies on diffracting large crystals that are identified by brightfield microscopy and usually optimized from an initial, smaller and lower quality crystalline hit. Because of the limits of the optical methods used to visualize and identify these crystals, smaller nanometer crystals (e.g. crystals smaller than 5 µm) are excluded from the results of typical evaluations. Though these potentially unidentified nanometer sized crystals are not useful for traditional synchrotron based X-ray crystallography, the new field of nanocrystallography, which utilizes a free electron laser to solve structures from nanocrystal slurries, makes these unidentified crystals highly useful. A new method, relying on transmission electron microscopy, to identify nanocrystals, determine if they are protein, and evaluate their quality has been devised.

The emergence of X-ray free electron laser (X-FEL) based serial femtosecond crystallography holds the promise of solving the three-dimensional structure of proteins that can only crystallize as nanocrystals (NCs) or are highly sensitive to radiation damage. In addition, because X-FEL NC experiments are performed at room temperature, there is no need for crystal cryo-protection. Given the new opportunities that X-FELs offer to the field of crystallography, efficient methodologies to detect and optimize conditions yielding NCs will be essential for future developments in structural biology. Current methods to detect the presence of NCs include dynamic light scattering (DLS), bright-field microscopy, birefringence microscopy, and intrinsic tryptophan ultraviolet (UV) fluoresce imaging, as well as technologies that rely upon Second Harmonic Generation such as Second Order Nonlinear Imaging of Chiral Crystals (SONICC). However, limitations of these imaging techniques include: 1) ineffective detection of NCs smaller than 5 µm; 2) false positive conditions as a result of interference from precipitate backgrounds; and 3) false negative conditions resulting from the lack of tryptophan residues in the case of UV fluorescence, and from the lack of chiral centers in the case of SONICC. Although DLS can accurately measure the size distribution of nanometer sized protein aggregates, it is unable to distinguish between amorphous or crystalline samples. Due to limitations on spatial resolution of optical systems, none of these methods in their currently available commercial form can be used for optimization of NCs or to distinguish NCs quality.

Here a protocol based on UV fluorescence microscopy and dynamic light scattering (DLS) was used to detect crystallization drops containing NCs, followed by TEM to accurately identify protein NCs. NC quality was assessed by evaluating the reciprocal lattice reflections in virtual diffraction patterns calculated from TEM images, and promising NC candidates were then screened for diffraction quality at the coherent X-ray imaging (CXI) end-station of the linac coherent light source (LCLS).

Methods

Protein Production and Crystallography Condition Screening

Figure 18:
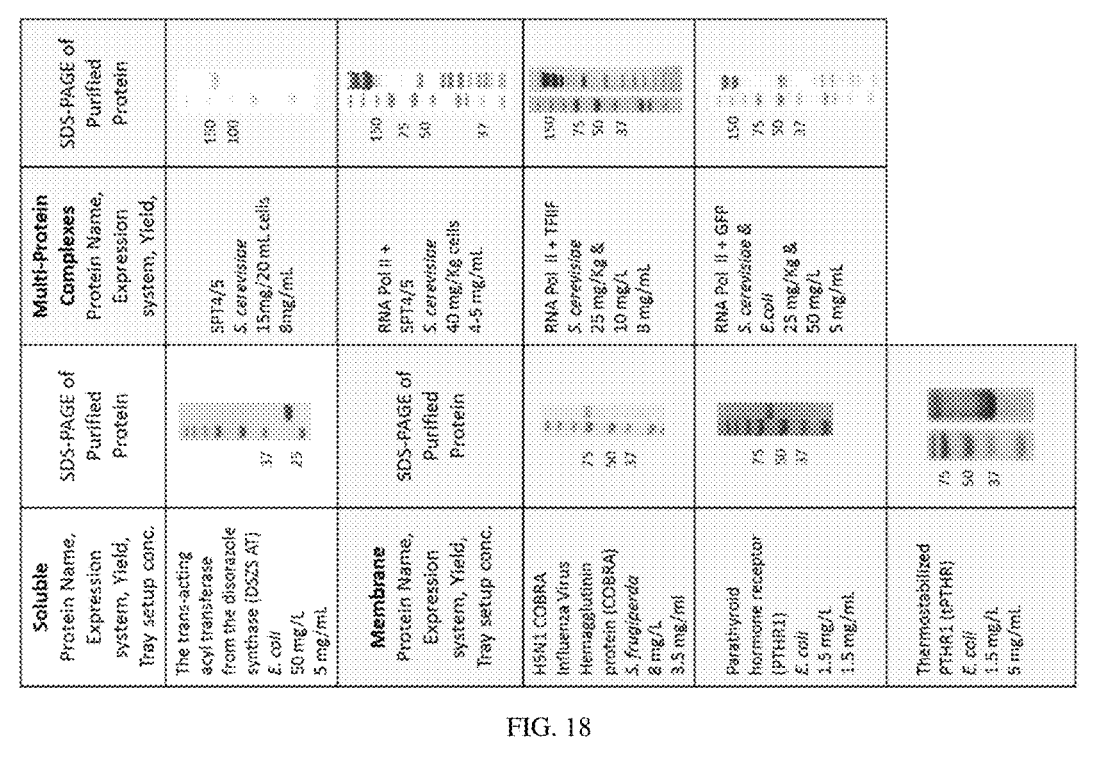

Nine proteins were used for nanocrystallography screening, as shown in FIG. 18 along with the expression system, protein yield and maximal concentration (while maintaining monodispersity) that was used to set up trays. The expression and purification of DSZS AT, PTHR, CD3-Delta and RNA Polymerase (RPBII) and complex formation with RPBII were performed by standard, literature techniques known to a person of ordinary skill in the art. Thermostabilized PTHR (tPTHR) was purified following the same protocol as described for full length PTHR. TFIIF was purified as previously described. GFP was expressed and purified by standard methods. RPBII-TFIIF and RPBII-GFP complexes were assembled by adding 2.5 molar excess of TFIIF or GFP to RPBII. RPBII-TFIIF was purified using calmodulin-affinity chromatography. The RPBII-GFP complex was isolated using a Superdex 200 10/300 GL (50 mM Hepes pH 7.5, 100 mM KCl, 4 mM DTT, 2 mM $CaCl_2$ and 10 µM $ZnCl_2$).

Spt4 and Spt5 were overexpressed in E. coli Rosetta (DE3) competent cells. Cells were grown at 37° C. to an optical density of 0.6 at 600 nm, induced with 0.5 mM IPTG for 4 hours at 30° C. and 2 mM IPTG for 2 hours at 37° C., respectively. Approximately 30 grams of cells (mixing 15 grams spt4 cell with 15 g spt5 cell) were re-suspended in 150 mL of buffer A containing 250 mM NaCl, 25 mM Tris pH 7.5, 10 µm $ZnCl_2$, 5 mm imidazole, 0.1 mm PMSF, 0.5 mm $C_{13}E_8$, 10% Glycerol, 2 mM β-mercaptoethanol (β-met) and 1× protease inhibitors (PI). After sonication for 2 minutes and centrifugation for 45 minutes at 35,000 rpm to separate pellet and supernatant fractions, the supernatant was loaded onto a $Ni^{2+}$ NTA (Sigma) column. The column was washed with buffer A with 25 mM imidazole and eluted with 150 mM imidazole in buffer A. The protein was desalted into buffer B containing 150 mM NaCl, 25 mM Tris pH 7.5, 10 µM $ZnCl_{12}$, 0.1 mM PMSF, 0.5 mM $C_{13}E_8$, 10% Glycerol, 2 mM β-met and 1×PI, and then applied to a HiTrap Heparin HP (GE Healthcare, USA) column. The elution was performed with a linear gradient up to 1 M NaCl in buffer B. The elution fraction at the last peak was collected, concentrated and further purified by gel filtration using Superdex 200 (10/300 GL) column in the buffer B. The fractions containing the single peak were pooled, concentrated and stored at −80° C.

TFIIB was overexpressed in DE3 cells. Cells were grown at 37° C. to an optical density of 0.6 at 600 nm, induced with 0.25 mM IPTG for 6 hours at 30° C. Approximately 20 grams of cells were re-suspended in 100 mL of buffer A containing 500 mm KCl, 25 mm Hepes pH 8.0, 0.1% Triton X-100, and 1×PI. After sonication for 2 minutes and centrifugation for 45 minutes at 35,000 g to separate pellet and supernatant fractions, the supernatant was loaded onto chitin beads which were washed with 0.3 M NaOH, $H_2O$ and buffer A. The column was washed with buffer A (more than 10 column-volumes), and then 50 mM β-met in buffer A (3 columns) was added, rocking in the cold for overnight. The protein was desalted into buffer B containing 100 mM KCl, 25 mM Hepes pH 7.0, 2 mM β-met and 1×PI, and then applied to a HiTrap SP HP (GE Healthcare, USA) column. The elution was performed with a linear gradient up to 1 M KCl in buffer B. The elution fraction at the first peak was collected, concentrated and further purified by gel filtration using a Superdex 200 (10/300 GL) column buffer B. The fractions containing the single peak were pooled, concentrated and stored at −80° C.

High concentration of H5N1 protein was obtained by first growing a large SF9 large culture: 3.2-4 L of $2 \times 10^6$/mL infected with H5N1-10x-his baculovirus at a MOI of 2.0 to get 30-40 grams of cells. The insect cells were harvested at 48-50 hours post-infection. 15 grams of cell pellet was washed with PBS and then re-suspended with buffer C (150 mM NaCl, 35 mM Hepes pH 7.5) plus 1×PI. Cell lysis was performed by sonication followed by the addition of DNase, a short incubation and ultracentrifugation (40000 rpm for 1 hour). The pellet obtained was used for the detergent extraction step. To solubilize the H5N1 protein from the membrane pellet 30 mM of Sarcosine plus 10 mm FOS-Choline 12 in buffer D (75 mm NaCl, 35 mm Hepes pH 7.5) were used to homogenize the pellet. The homogenized pellet was incubated at 4° C. with continuous rocking overnight. After incubation the sample was ultracentrifuged (40000 rpm for 1 hour) to obtain the supernatant containing the solubilized protein, which was then diluted 1:1 with buffer D to reduce the detergent concentration by half. The diluted sample was mixed with 15 ml of $Ni^{2+}$ beads (pre-equilibrated with 15 mM Sarcosine/5 mM FOS-Choline in buffer D) for batch binding overnight. A detergent exchange (from 15 mM Sarcosine/5 mM FOS-Choline to 7.5 mM Sarcosine/4 mM Fos-Choline) gradient was performed using an ÄKTAxpress (GE Healthcare Life Sciences). After the gradient was completed, the sample-$Ni^{2+}$ beads were washed with buffer D with the addition of 4 mM Fos-choline. Finally, the beads were washed with an astringent buffer of 250 mM NaCl, 35 mM Hepes pH 7.5 and 25 mM imidazole to remove all the unspecific proteins and extra material. To elute the protein from the $Ni^{2+}$ beads, 300 mM imidazole in buffer D were used.

After elution, the protein sample was concentrated by centrifugation with a 100 kDa MWCO Concentrator (Vivaspin 20, GE Healthcare) and subsequently loaded onto a desalting column (GE Healthcare) to remove imidazole. The desalting column flow-through containing the protein was loaded into an anion exchanger column (Resource Q Hi Trap, 1 ml column, GE Healthcare) to remove the unspecific proteins eluted with the 300 mM imidazole elution together with the H5N1. Most of the unspecific proteins passed through the Q column whereas the H5N1 protein remained attached to the column matrix. The elution was performed with high salt buffer (300 mM NaCl).

A variety of commercially available crystallography screens were utilized for nanocrystallography screening including the Hampton Research screens Crystal Screen 1 and 2, Index, PEG/Ion, SaltRx, Silver Bullets and MembFac as well as Qiagen JCSG. Both hanging (Hampton Research VDX™ Plates) and sitting drop (Hampton Research Cryschem Plates) methods were used for screening 4 μL drops, they were set up in a 1:1 ratio of protein to mother liquor so as to have sufficient volume for further DLS and TEM experiments. 350 μL of commercial screening solution was used in the well for each condition.

Generating Crushed Crystals of Thick Nanocrystals Using a Kit Disclosed Herein 0.5 mm glass beads (Research Products International) were used to crush NCs too thick for lattice visualization by TEM. 20-35 mg of beads were placed in a 1.5 mL microcentrifuge with the addition of the NC sample directly from the crystal plate along with 5 μL of reservoir solution. Samples were vortexed for 10 seconds, twice, before being used for TEM grid preparation.

Generating Crushed Crystals of the DSZS AT for X-FEL Analysis Using a Commercially Available Kit The DSZS AT was purified and crystallized as previously described by mixing 10 μL well solution with 10 μL of purified protein at 5 mg/mL, and allowing crystals to grow at room temperature for up to one week. The crystallization solution contained 18-24% PEG 3350, 100 mM Na-HEPES pH 7.5, and 40 mM ammonium acetate. Approximately 900 μL of drops containing crystals were collected. When the crystals had settled to the bottom of the tube, it was estimated that the mixture contained approximately 50% crystals. The crystals were held at room temperature until crushing and exposure to the LCLS X-FEL. The tube was inverted several times to re-suspend the crystals, and the samples were crushed in 90 μL aliquots by vortexing at high speed for 3 minutes with a teflon seed bead (Hampton Research HR2-320). Examination of crystal samples under a standard light microscope revealed large crystal fragments (edges >10 μm). Therefore, samples were further processed through a 10 $μm^3$ filter prior to exposure with the LCLS using the Coherent X-ray imaging (CXI) instrument.

Generation of Crystal Catalogues

Figure 19:
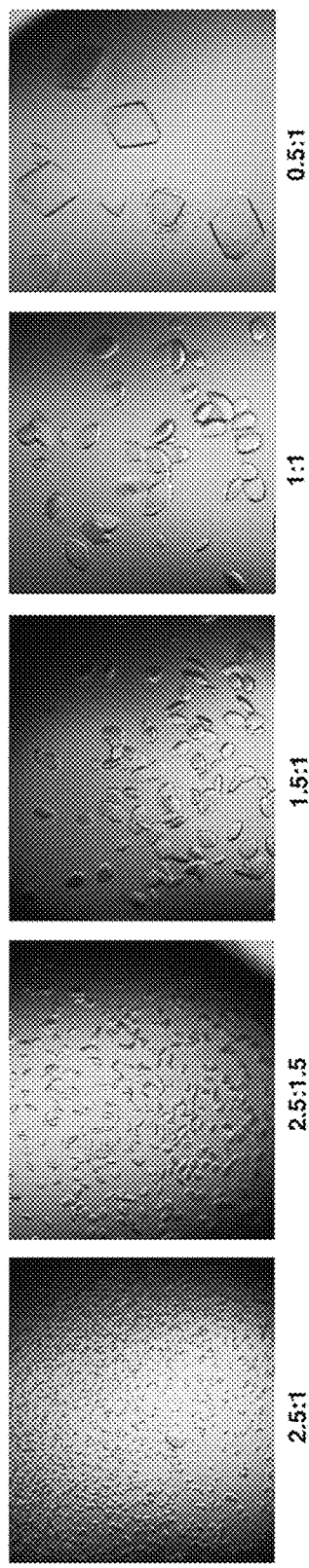
FIG. 19 provides a series of images illustrating the collections of homogeneous crystal sizes generated in crystal drops with different ratios of volumes of protein:precipitant.

Given the advances provided by X-ray diffraction experiments using free electron lasers, it is very desirable to generate high quality and homogeneous populations of NCs (heretofore referred as crystal catalogues) to be used in coherent X-ray imaging (CX-I) or X-ray pump-probe (X-PP) investigations (>20 micrometers). In order to generate crystal catalogues, nano-seed slurries were used to fine-tune crystal size. One to two drops with large numbers of crystals with sizes varying from 10-30 μm were diluted about 30 times (depending on the amount of crystals) with mother liquor and loaded into a 1.5 mL Eppendorf tube. Approximately 10 stainless steel (magnetic) balls of 1.0 mm diameter were loaded into the tube and the mixture was vortexed twice for 10 seconds, followed by brightfield and UV inspection to corroborate lysis efficiency and size of nanoseeds. A 1:3 dilution with mother liquor was performed with the seeding stock. Crystal drops were set with different ratios of volumes of protein:precipitant (2.5:1, 2.5:1.5, 1.5:1, 1:1 and 0.5:1) and seeded with equal amounts of nano-seeds from the seeding stock using a 0.3-0.4 millimeter cryo-loops (Hampton Research). As expected, all seeded drops generated collections of homogeneous crystal sizes (FIG. 19), and such patterns were absent for non-seeded drops (not shown).

X-FEL Analysis of Nanocrystals

Diffraction experiments were carried out at the CXI end-station of the LCLS using 10.5 keV X-ray pulses of 40 fs duration for measurements of RPBII-GFP and PTHR and 8.5 keV X-rays pulses of 50 fs duration for DSZS. Crystal delivery was performed using the gas dynamic virtual nozzle (GDVN) using an injection rate of 20 μL/minute and a pressure of 750 PSI nitrogen, 300 PSI shield. Data were analyzed using the CCTBX.XFEL software package. The RPBII-GFP sample yielded a hit rate of approximately 2.5%, and an indexing rate of 0.6%, 25% of hits (using a threshold of 16 spots above 450 ADUs per image). Diffraction on the best images was up to 4 Å. The DSZS sample yielded a hit rate of approximately 2.7%, and an indexing rate of 0.07%, 29% of hits (using a threshold of 16 spots above 450 ADUs per image). Diffraction on the best images was up to 1.8 Å.

Nanocrystals Candidate Identification and UV Tryptophan Screening

Figure 20:
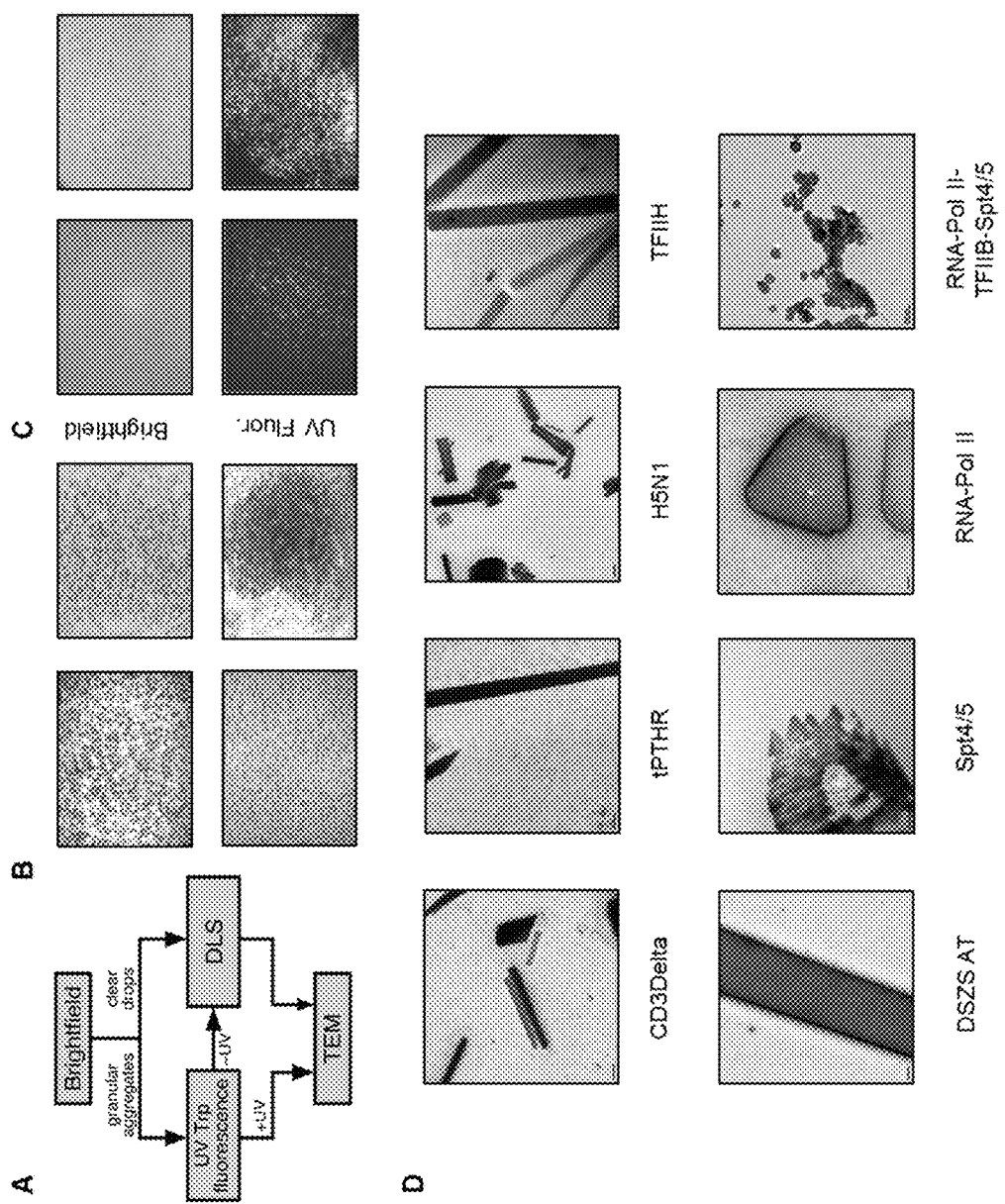
FIG. 20 provides a flow chart of the protocol used to identify protein NCs from crystallization drops, and representative images of granular aggregates used for TEM.

Visual selection using an Olympus SZX16 brightfield microscope and corresponding 2XPFC objective was performed to identify nanocrystal candidates. Drops that either had visible precipitation with individual aggregates or a lawn of precipitate were selected for UV-fluorescence imaging, as shown in the examples of FIG. 20B and FIG. 1. Candidates selected visually were then subjected to UV fluorescence imaging with UV exposure from 1-5 seconds, using a Jan Scientific Jansi UVEX microscope. Images were analyzed using the Jan Scientific CrystalDetect software. Once UV-positive conditions were identified, drops were harvested and high quality images were taken of each drop using an Infinity 2-3C camera and Infinity Capture software from Lumenera Scientific. Harvested drops were subsequently used for DLS and TEM experiments.

Dynamic Light Scattering

To test the limits of the Wyatt DynaPro plate reader for detecting nanoparticles of various radii, silica spheres (PolySciences, Inc.) experiments were performed in a 384 Corning clear bottom plate using beads diluted 1:1000 with Millipore water with 15 µL of diluted beads deposited in the well. DLS data was acquired by performing 20 acquisitions, 6 seconds each acquisition, at 18° C.

To determine the uniformity as well as the range of the precipitate size of selected nanocrystal candidates, samples were taken directly from the drop of the crystallization plate and put into a Greiner Sensoplate (glass bottom) 1536 well plate and DLS data was collected for 20 acquisitions, 6 seconds each acquisition, at 18° C. These plates allowed a low working volume for screening (3 µL) as well as enhanced data clarity due to their glass bottoms. Samples were diluted with mother liquor up to a volume of 3 µL when necessary. If low intensity was observed and sufficient protein was available, additional drops were set up using the same conditions and combined to increase intensity.

Transmission Electron Microscopy 400 square mesh copper grids with continuous carbon film (Electron Microscopy Sciences) were freshly glow-discharged for 1 minute, 25 mV (EmiTech KX100) before incubation with samples. Selected samples were applied to grids by two methods depending on the concentration of nanoparticles. When a sufficiently high concentration of particles was present (i.e., when particles were visible, dense and gave a DLS intensity signal above 1.25), 5-8 µL of sample was applied and incubated for 30 seconds on a grid before blotting and staining with 2% uranyl acetate. Lower density samples were applied to the grid by placing a drop of the sample in a parafilm-lined petri dish along with at least 300 µL of mother liquor from the sample's origin in close proximity to the sample drop. A grid was put on top of the drop of sample, carbon side down, and the petri dish was sealed and the sample was allowed to incubate for 10-60 min before staining with uranyl acetate. TEM images were acquired using an FEI Tecnai T12 electron microscope operating at 120 kV using a single-tilt specimen holder. Images were collected with a 2 k×2 k Gatan UltraScan 1000 CCD camera.

Results

In order to develop a comprehensive method for identifying NCs, a four-step pathway was devised (FIG. 20A). A variety of targets from three different systems were chosen as test cases, including soluble proteins, membrane proteins, and multi-protein complexes (FIG. 18). Crystallization of protein samples using commercially available screens typically yields a spectrum of morphologies including: 1) clear drops (FIG. 1A); 2) drops with granular aggregates (which can be amorphous or comprised of well-differentiated individual particles) (FIG. 1B); 3) drops with large solid aggregates (probably associated with sample denaturation) (FIG. 1C); and 4) drops with phase separation. Such morphologies depend on the protein sample and the chemical nature of the precipitant (FIG. 2). For this study, conditions yielding granular aggregates (FIG. 20B) and clear drops were selected for further analysis.

Figure 21:
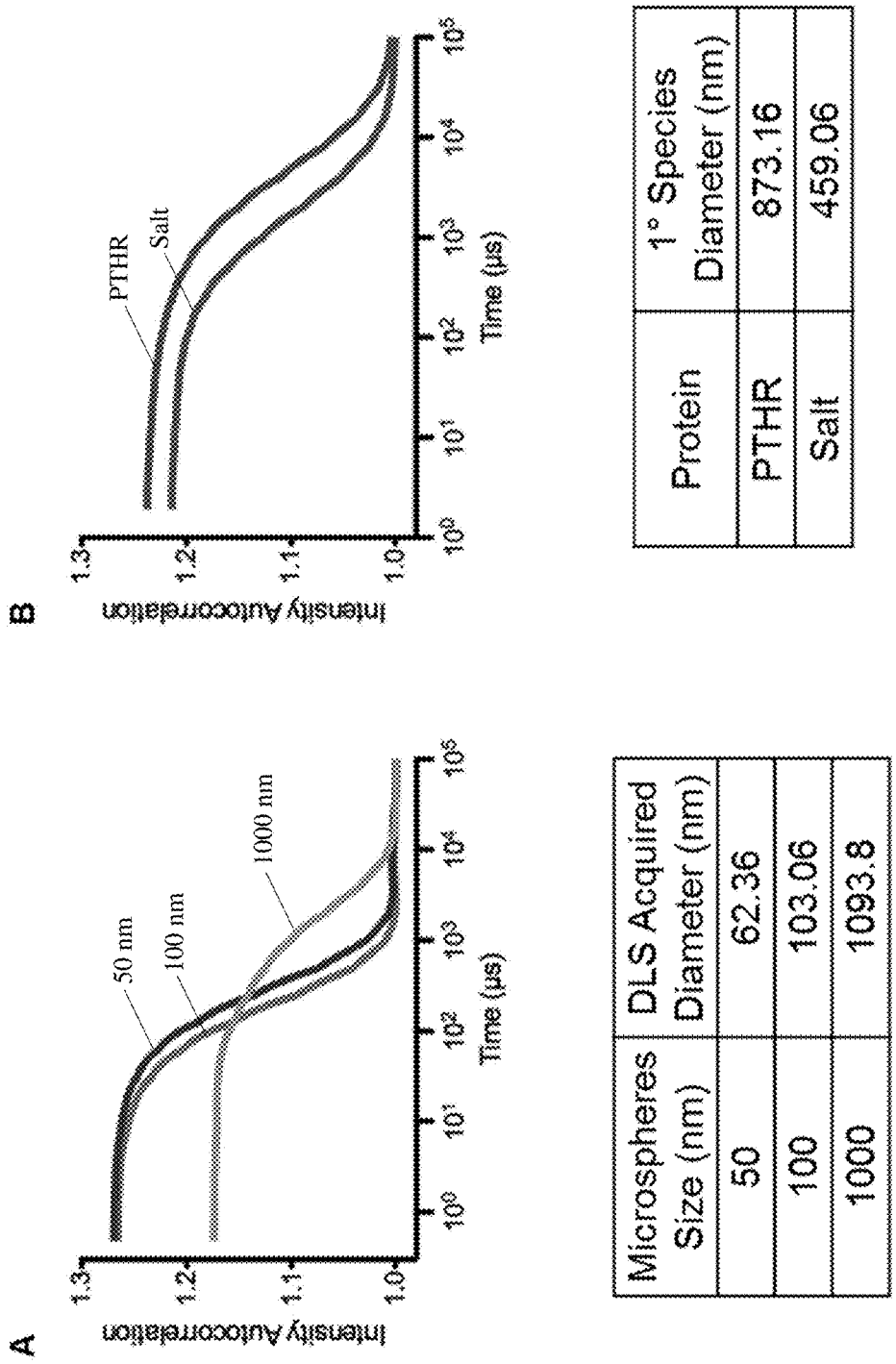
FIG. 21 provides A) correlograms of commercially available nanospheres used to verify the ability of the Wyatt Dynapro DLS system to detect particles sizes ranging from 50-1000 nm, and B): Example correlograms obtained from measurement of PTHR1 and salt nanocrystals.

To determine whether granular aggregates were proteinaceous in nature, UV tryptophan fluorescence microscopy was used (Jansi UVEX). Drops with UV-positive granular aggregates were selected for direct TEM visualization. FIG. 20C shows the Brightfield and UV Fluorescence of granular aggregates, which can comprise UV-positive, well-differentiated nano-particles (left pair) or UV-positive, diffuse nano-aggregates (right pair). Since clear drops have been shown to yield NCs, and UV tryptophan fluorescence microscopy can yield false negatives, UV-negative granular aggregates and clear drops were further processed using DLS to assess the presence of nanoparticles (FIG. 21). DLS measurements were performed using a Wyatt DynaPro Plate Reader Plus in batch mode (ideal for screening large numbers of crystallization conditions). In order to accurately assess the size of the primary nano-species of the sample, calibration studies using nanospheres (Polysciences, Inc.) with particle radii of 50, 100 and 1000 nm were compared to the sample's autocorrelation function and decay time (FIG. 21A). DLS measurements of clear drops and UV-negative granular aggregates allowed detection of particles with diameters of 50-1000 nm (FIG. 21B). In order to determine whether these particles were crystalline or merely protein aggregates, further assessment using TEM was performed.

Figure 22:
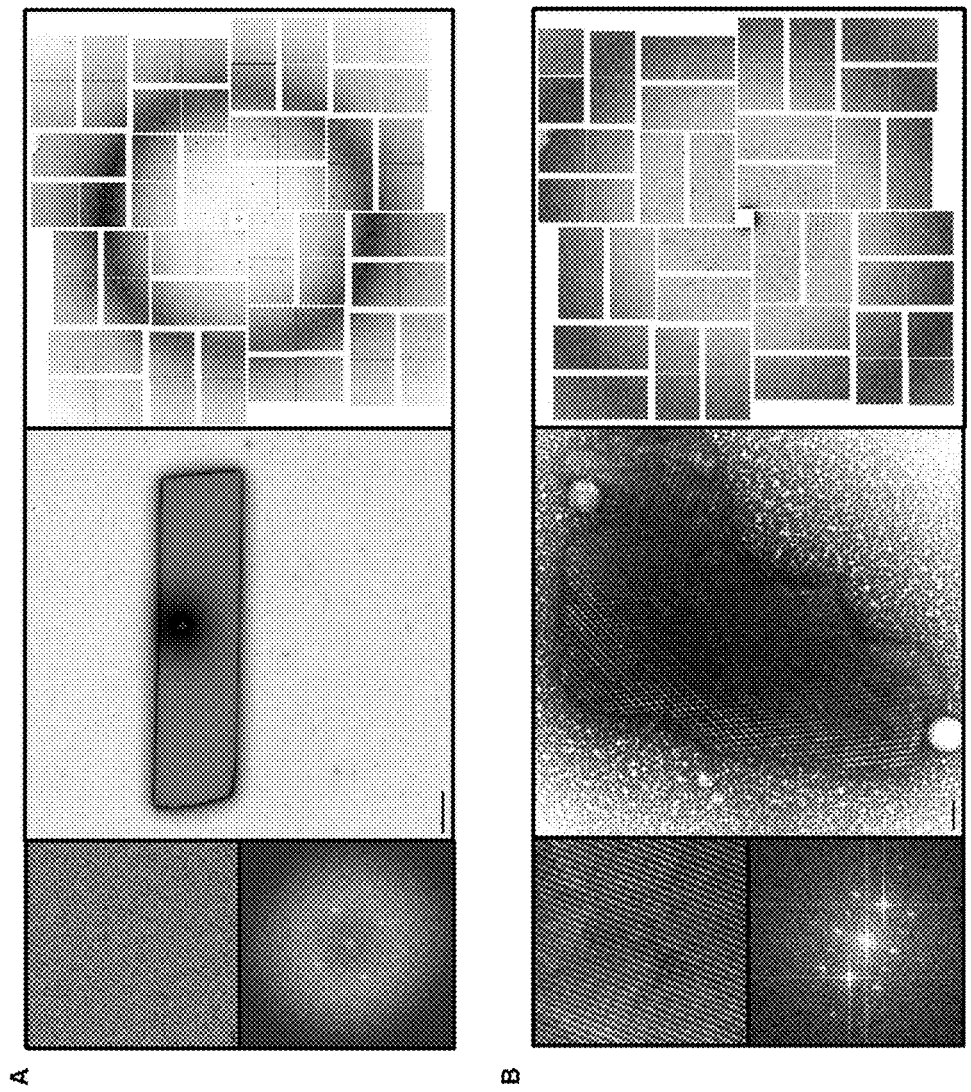
FIG. 22 provides TEM images of nanocrystals and accompanying lattice and FFT on left side from the same crystallography conditions, and the accompanying diffraction pattern X-FEL diffraction pattern on right.
Figure 23:
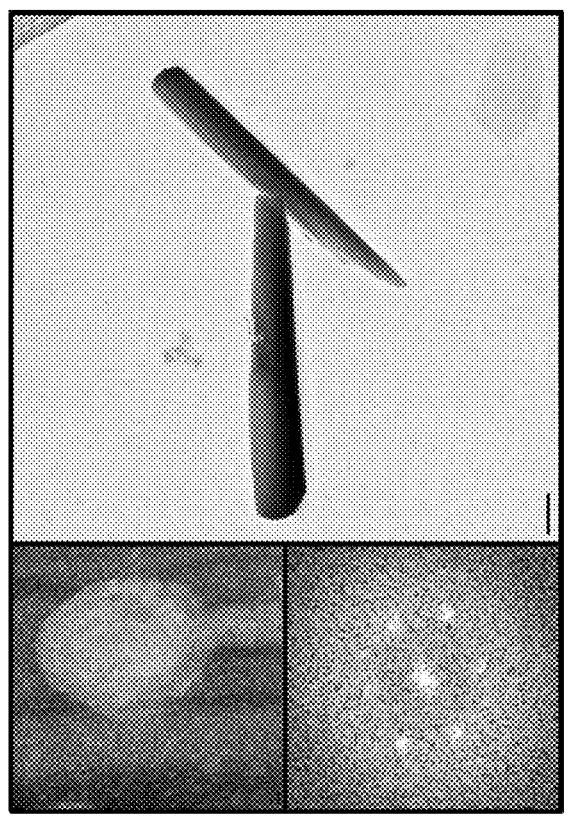
FIG. 23 provides TEM images of PTHR1 nanocrystals and accompanying lattice and FFT on left side from the same crystallography conditions, with the scale bar from top left to larger image: 20 nm and 0.5 μm.
Figure 24:
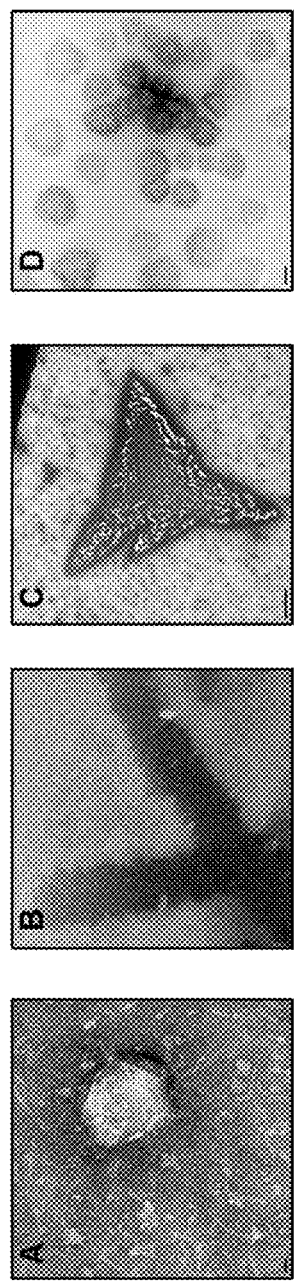
FIG. 24 provides representative images of commonly observed salt nanocrystals; A) Calcium chloride NCs coated in protein filaments (scale bar 20 nm), B) Bis-tris pH 6.5 & PEG MME 2000 (scale bar 50 nm), C) Sodium chloride (scale bar 5 μm), and D) Tacsimate (Hampton Research) (scale bar 0.5 μm).

UV- and DLS-positive samples were applied to a copper grid with continuous carbon film, stained with a 2% solution of uranyl acetate and imaged using an FEI Tecnai T12 transmission electron microscope. Samples were taken directly from the crystal tray before transferring to a grid. In most circumstances, a single crystal drop containing thick aggregates was of sufficient concentration for imaging. For the majority of samples tested, TEM visualization (FIG. 22 and FIG. 23) provided an efficient method to reveal whether samples contained NCs or large protein aggregates. FIG. 23 shows A) DSZS AT diffraction up to 1.8 Å resolution, and B) RPB1I-GFP with diffraction up to 4 Å acquired at LCLS, with the scale bar from top left to larger image (A) 20 nm and 1 µm, and (B) 50 nm and 100 nm. In addition, the presence of detergents in crystallization buffers did not appear to have a negative impact on visualization, and NCs for three membrane proteins were detected, CD3Delta, thermostabilized PTHR (tPTHR) and H5N1. FIG. 20D provides the TEM images of all the proteins detected (scale bars: CD3Delta 0.5 tPTHR 0.5 µm, RNA-Pol II-TFIIB-Spt4/5 200 nm, TFIIH 200 nm, DSZS AT 0.5 µm, Spt4/5 200 nm, RNA-Pol II 0.2 µm, H5N1 0.2 µm). Since TEM allows visualization of crystal lattices, protein NCs could be discriminated from salt crystals, including those coated with protein aggregates that generated false-positive UV-signals (FIG. 24A).

Diffraction experiments at the LCLS were used to check the diffraction quality of promising candidate NCs. Of the three samples shown in FIG. 22 and FIG. 23, only DSZS AT, the trans-acting acyl transferase from the disorazole synthase, and RBPII-GFP (FIG. 22) yielded significant diffraction. Visual inspection of the TEM lattices shown on the left reveals a qualitatively better lattice for FIGS. 22A and B compared to FIG. 23, consistent with the X-FEL diffraction findings. This suggests that if a lattice appears to be of high quality under negative stain TEM, it is likely to diffract well at a free electron laser.

While most NCs identified by TEM came from crystallization drops with UV-positive granular aggregates, a few were identified from UV-negative granular drops using DLS. Protein NCs were not detected in clear drops that were preselected via DLS—most particles observed by TEM corresponded to large protein aggregates and salt crystals. However, thorough evaluation of all conditions should be pursued when UV positive conditions are scarce, because the presence of NCs in clear drops has been previously reported.

Conclusions

Figure 25:
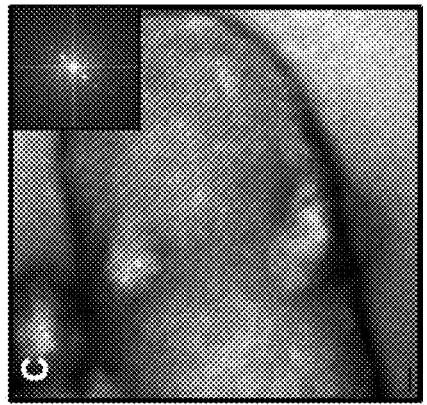
FIG. 25 provides TEM images of the high quality lattices of NCs A) Lysozyme (scale bar 50 nm), (B) RPB1I-GFP (scale bar 100 nm), and C) Pol-TFIIF (scale bar 20 nm).
Figure 25:
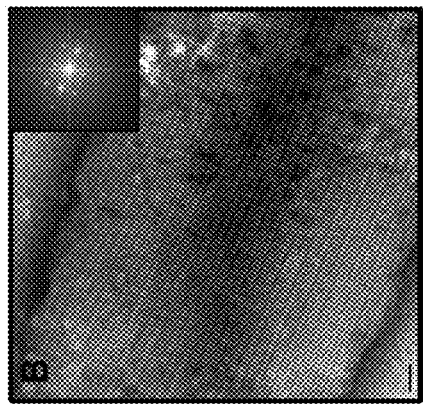
Figure 25:
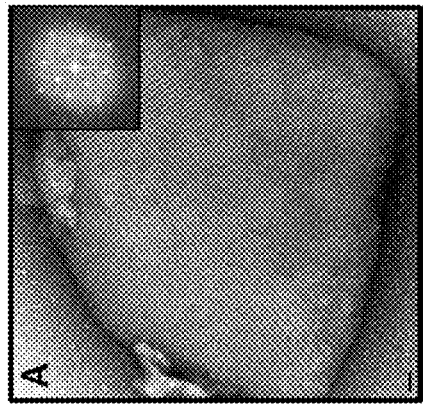

Crystallization screening of protein samples involves setting up hundreds and sometimes thousands of crystallization drops often without a single macro-crystal 'hit'. However, the emergence of X-FEL based serial femtosecond crystallography demonstrates that three-dimensional structures of protein samples can be solved from NCs. To this end, we have developed an efficient method to detect the presence of protein NCs in UV-positive granular aggregates from crystallization drops using classic negative-stain transmission electron microscopy. The investigations detailed here show that crystallization trials of most protein samples can potentially yield NCs even for challenging systems such as MPCs and membrane proteins. In addition to NC identification, the use of TEM may provide additional insights including: 1) the possibility of finding NCs with different crystals forms; and 2) the evaluation of NC diffraction quality. Since crystalline lattices can be directly visualized with TEM, calculating Fourier transforms from the images allows quantitative evaluation of electron diffraction patterns (Bragg spots). Three examples of clear lattices with two or higher order spots are evident in the reciprocal lattice reflections obtained by Fourier transform (FIG. 25). Furthermore, selection of crystals with higher order diffraction spots could potentially yield higher resolution X-ray diffraction data.

This report establishes a method for pre-screening NCs with no previous large crystal hits for use at an X-FEL. In addition to the advantages that TEM brings to the field of nanocrystallography, NC imaging may be beneficial during conventional crystallization trials to improve crystallization conditions and provide useful crystal 'seeds' for the production of macro-crystals. This work demonstrates the potential of TEM to serve as a fundamental tool for evaluating NCs, as essential as brightfield microscopy is for evaluating and optimizing traditional, large crystals.

Example 3

Second Example Application Using a Disclosed Kit

Presented herein is an embodiment of a method to generate homogeneous nanometer-size seeds (nano-seeds) from crystals or nano-crystals (NC). Ultraviolet (UV) brightfield microscopy was used for quantitative the seeding experiments, and the nano-seed quality was evaluated by examining crystal lattices using TEM. Seeding experiments were then performed using the high quality nano-seeds to obtain large crystals for conventional X-ray diffraction experiments, or crystal catalogues, i.e., homogeneous sets of crystals of varying sizes for conventional X-ray or X-FEL applications.

Expression and purification of RNA Polymerase (Pol II), Delta 47, TFIIF and Pol II-CD3Delta were performed by standard methods known to a person of ordinary skill in the art. To assemble a Pol II, DNA/RNA scaffold, TFIIB complex (PB-25), a 54-nts oligonucleotides containing a single stretch of 25 non-complimentary bases and a 5-mer RNA (complimentary to the template strand) were annealed above their melting temperatures and allowed to cool down slowly to 4° C. over a period of 5 hours. For PB-15, a 45-nts oligonucleotides containing a single stretch of 15 non-complimentary bases and a 6-mer RNA was used. The resulting DNA/RNA scaffold was incubated with 12-subunit Pol II (3:1 molar ratio) and excess DNA/RNA scaffold was removed using size exclusion chromatography on a superdex 200 column (GE Healthcare). TFIIB was purified as described by Stevenson, et al., *Proc. Natl. Acad. Sci., U.S.A.* 2014, Vol. 111:8470-8475, and was mixed with a Pol II-DNA-RNA scaffold (3:1 molar ratio (TFIIB:Pol II DNA-RNA scaffold) in high salt buffer. Removal of excess TFIIB was carried out using a second size exclusion step in low salt buffer (50-100 mM).

dGTPase with N-terminal 6× histamine tag using wild type was overexpressed in DE3 cells. Cells were grown at 37° C. to an optical density of 0.6 at 600 nm, induced with 0.4 mM IPTG for 16 hours at 18° C. Purification was first performed by Ni-NTA chromatography (GE Healthcare) followed by a gel-filtration chromatography (Hi-Load Superdex20016/60, GE Healthcare) equilibrated in 25 mM sodium phosphate at pH 7.5.

Crystallization conditions for these proteins are as follows:

Pol II: 4-7% PEG 6000, 300 mM sodium acetate, 200 mM ammonium acetate, 100 mM Hepes, pH 7.0, 10 mM DTT.

Delta47: 4-11% PEG 6000, 400 mM ammonium/sodium hydrogen phosphate, 50 mM dioxane, 10 mM DTT.

TFIIF: 8-12% PEG 400, 100 mM sodium malonate, 50 mM Hepes pH 7.0 and 10 mM DTT.

Pol II-CD3Delta: 1.4 M sodium malonate, 10 mM DTT, pH 6.0.

PB 25 and PB 15: 30-35% tactimate, 100 mM Hepes pH 7.0, 15 mM DTT.

dGTPase: 1.6 M Potassium/Sodium Phosphate pH 8.5.

Delta 47 dehydration experiments were performed according to the method disclosed in Cramer et al. *Science,* 2001, Vol. 292:1863-1876.

Brightfield and UV Tryptophan Screening

An Olympus SZX16 brightfield microscope fitted with a 2XPFC objective was used to screen crystallization drops for granular aggregates and visible crystals to be used for nano-seeding experiments. Granular aggregates and visible crystals that may be used for nano-seeding experiments were screened with a Jansi UVEX microscope to determine if the sample was proteinaceous in nature. Image analysis was performed using the Jan Scientific CrystalDetect software.

Crystal Fragmentation

Crystal fragmentation was performed using 1.00, 0.5 mm and 0.1 mm diameter glass beads (Research Products International). Approximately 25-30 mg of beads were placed inside a 0.5 mL PCR microfuge tube and washed twice with water and reservoir solution. Crystalline material from several (2-5, or more) crystallization drops (with over 30-50 crystals ranging from 20-100 μm) was added to beads on ice, and diluted with precipitant solution sufficient to cover above the glass beads (about 30 μL). Beads and sample were vortexed twice for 10 seconds. Two microliters of the resulting material were pipetted out an observed under brightfield microscopy. The crystalline material (hereafter referred to as nano-seeds) was homogeneous lysed and consisted of a large number of sub-micrometer particles. Typically, nano-seeds were made the same day as the crystal optimization experiment was to be performed. Fragmentation was reduced if there was not sufficient volume to cover the beads, but over dilution of the nano-seeds was also preferably avoided.

Nano Crystal Fragmentation

To detect the presence of NC in crystallization drops the protocol described by Stevenson et al., 2014 was followed. UV positive granular aggregates were selected for TEM imaging to confirm the presence of nanocrystals. Crystallization conditions bearing NCs were subject to one round of optimization to generate larger amount of nano-crystals for nano-seeding experiments. Material from 12-24 crystallization drops containing nano-crystals was collected. Nano crystals were fragmented following the protocol described previously, but with shorter vortexing times (5 seconds). To corroborate proper fragmentation and size homogeneity, samples were evaluated with brightfield and UV microscopy (Jansi) before and after lysis. Due to the presence of aggregates in the sample, observation of a UV-signal was of paramount importance to allow qualitative estimate of nano-seed concentration.

Nano Seed Quantification Using UV Microscopy

Fragmented crystals were diluted with mother liquor in different proportions including, 1:1, 1:2, 1:5, 1:25 and 1:125 in order to determine seed concentration. An aliquot (1-2 μL) from each dilution was placed on a haemocytometer (Hausser Scientific) and covered with a 22 mm glass coverslip (Hampton Research). Brightfield and UV-microscopy images were acquired for 1-4 sec with a Jansi UVEX microscope. Fragmented nano-seeds larger than 10 micrometer were visualized using a 5× objective; nanoseeds smaller than 10 micrometers were visualized using a 15× or 40× objective. Image analysis was performed using the Jan Scientific CrystalDetect software. Manual nano-seed counting was performed using the Cell Counter ImageJ software plugin and protocol for counting nanoseeds followed standard cell counting procedures.

Transmission Electron Microscopy Experiments (TEM)

Approximately 5 μL of fragmented samples was applied to 400 square mesh copper grids with carbon film (Electron Microscopy Sciences) made hydrophilic in a glow discharge (EmiTech) for 1 minute at 25 mV under atmospheric conditions. Sample was incubated on the grid for 30 seconds before blotting and staining with 2% uranyl acetate. EM images were acquired using a FEI Tecnai T12 microscope operating under 120 keV using a single tilt specimen holders. Images were collected onto a 2 k×2 k charge coupled device camera using the User Interface (for EM control and operation).

Results

Generation of Nano-Seeds

Figure 26:
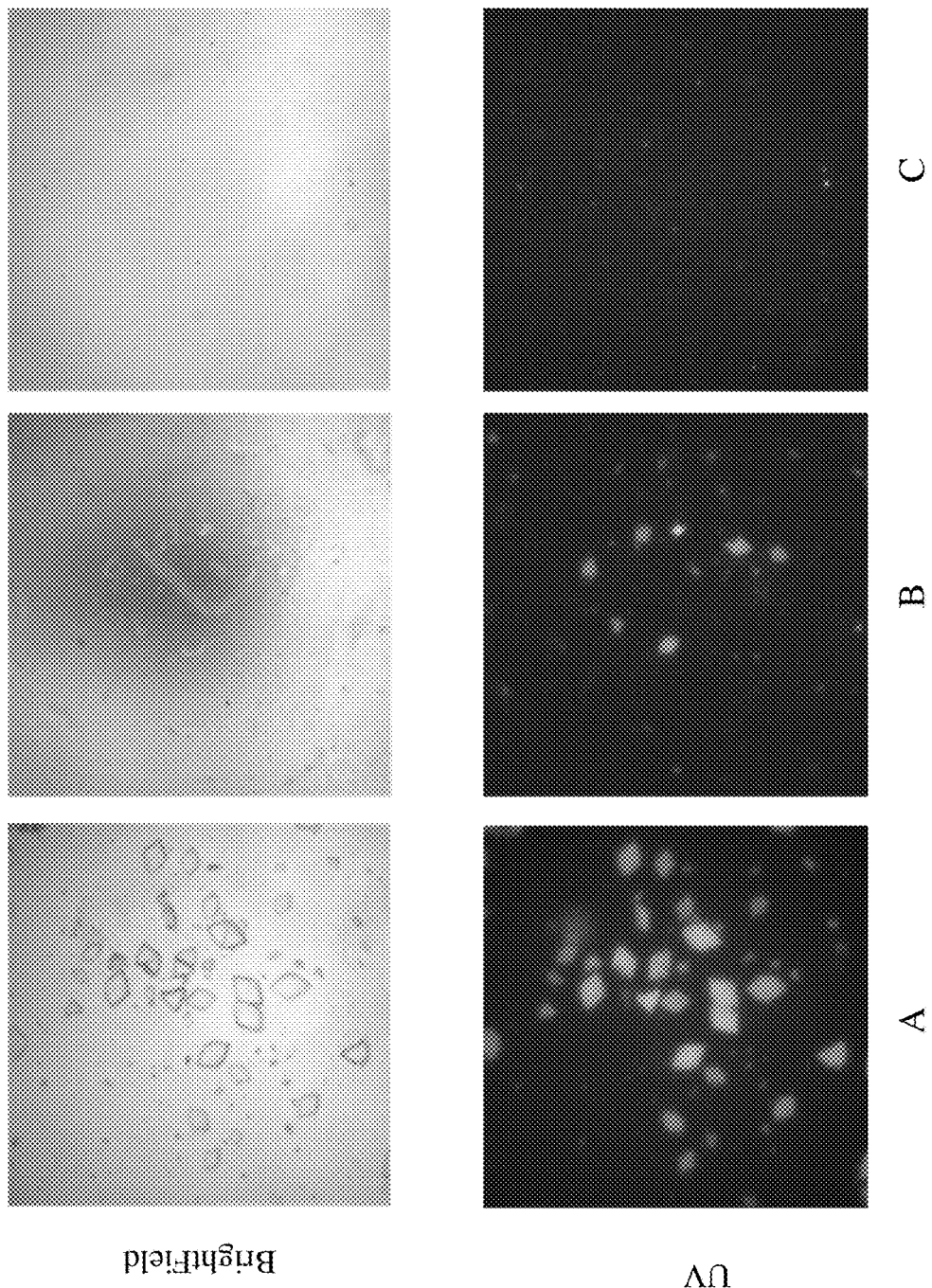
FIG. 26 provides UV and brightfield images of wild type Pol II nanocrystals before and after crushing with beads.

Crystals of two macro molecular complexes refractory to conventional optimization protocols (including precipitant and protein concentration, pH, temperature and additives) were selected for micro-seeding experiments. Characteristically, crystals were small (<100 μm for PB-15 and <20 μm for PB-25), lacked defined edges, diffracted to low resolution (below 8 Å) and were highly mosaic. FIG. 26A shows the crystals used in the crushing experiment. Brightfield and UV-microscopy analysis of crushed crystals using a 4 mm Teflon ball (Hampton Research) used for micro-seeding experiments revealed minimal and highly irregular crystal fragmentation (FIG. 26B). In order to achieve better fragmentation glass beads with lower diameters (0.1, 0.5 and 1.0 mm) were employed, using the protocol described above. Observation of the crystalline material under the UV microscope revealed the presence of homogenous particles "nanoseeds" of low-micrometer and sub-micrometer sizes when fragmented with 0.5 mm glass beads (FIG. 26C). The crystals underwent significantly more shearing when crushed with the glass beads with the smaller diameter.

Evaluation of Nano-Seed Quality

Figure 27:
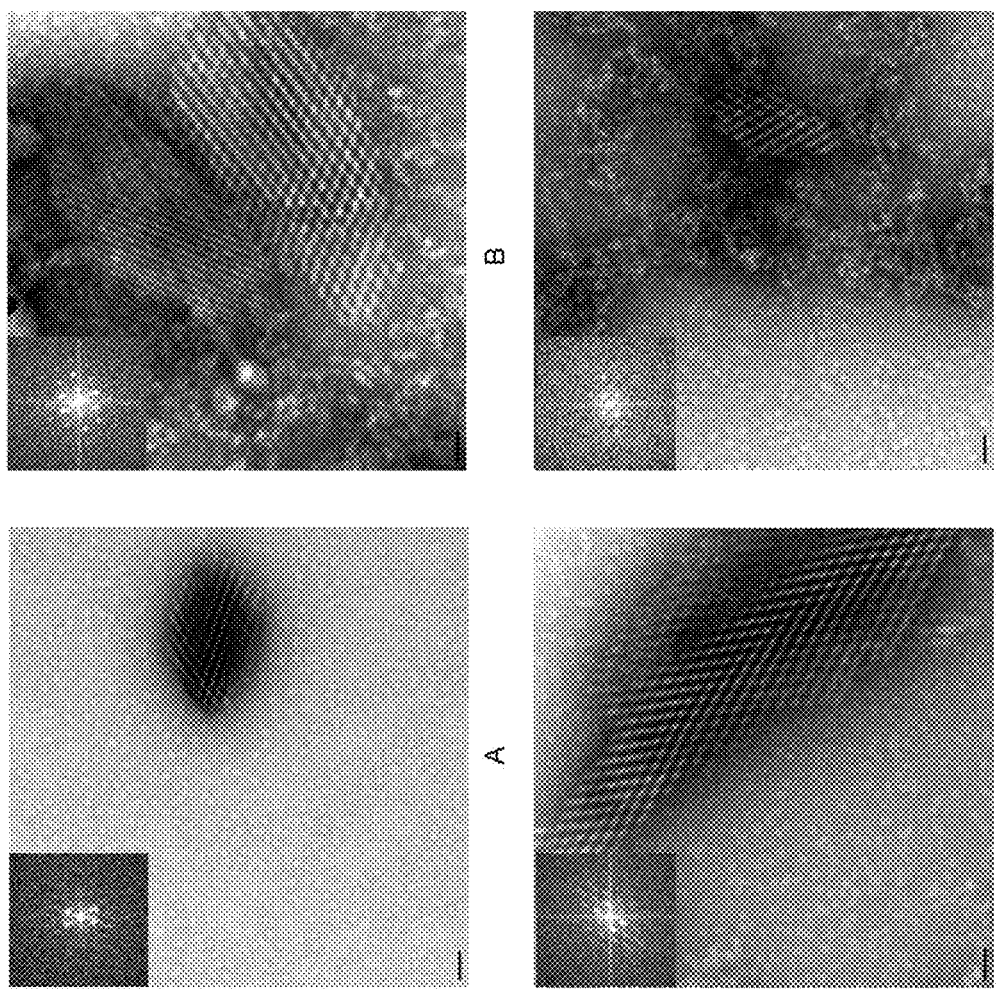
FIG. 27 provides TEM images of Pol II nano-crystals crushed with 0.5 mm beads.
Figure 28:
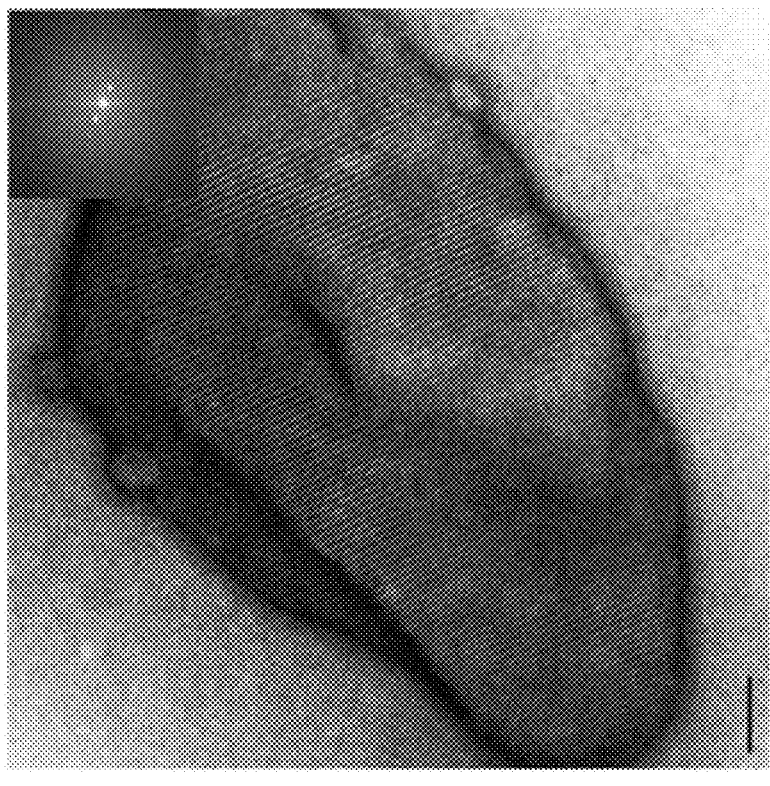
FIG. 28 provides TEM images illustrating an evaluation of nano-seed thickness.
Figure 28:
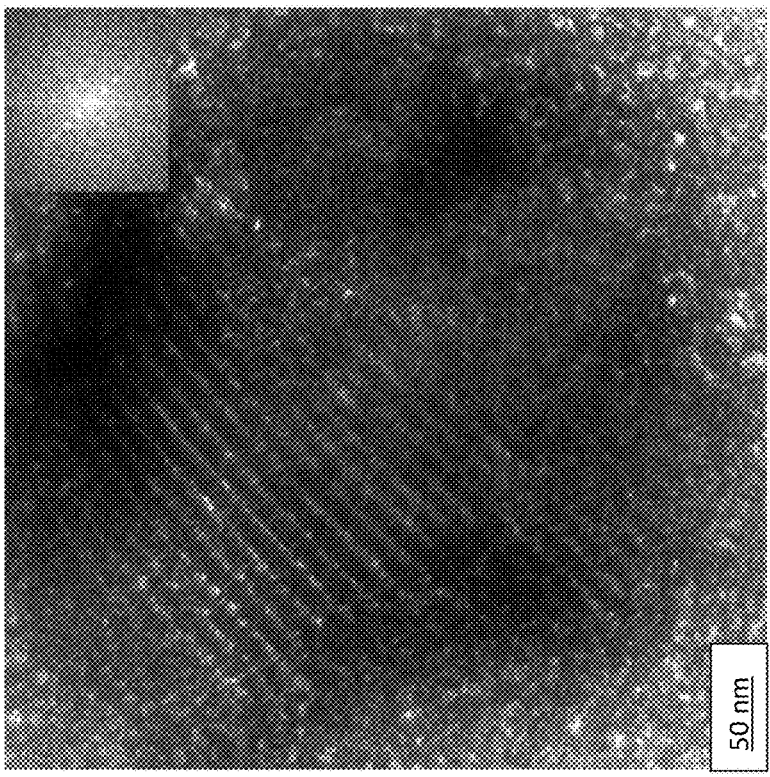
Figure 29:
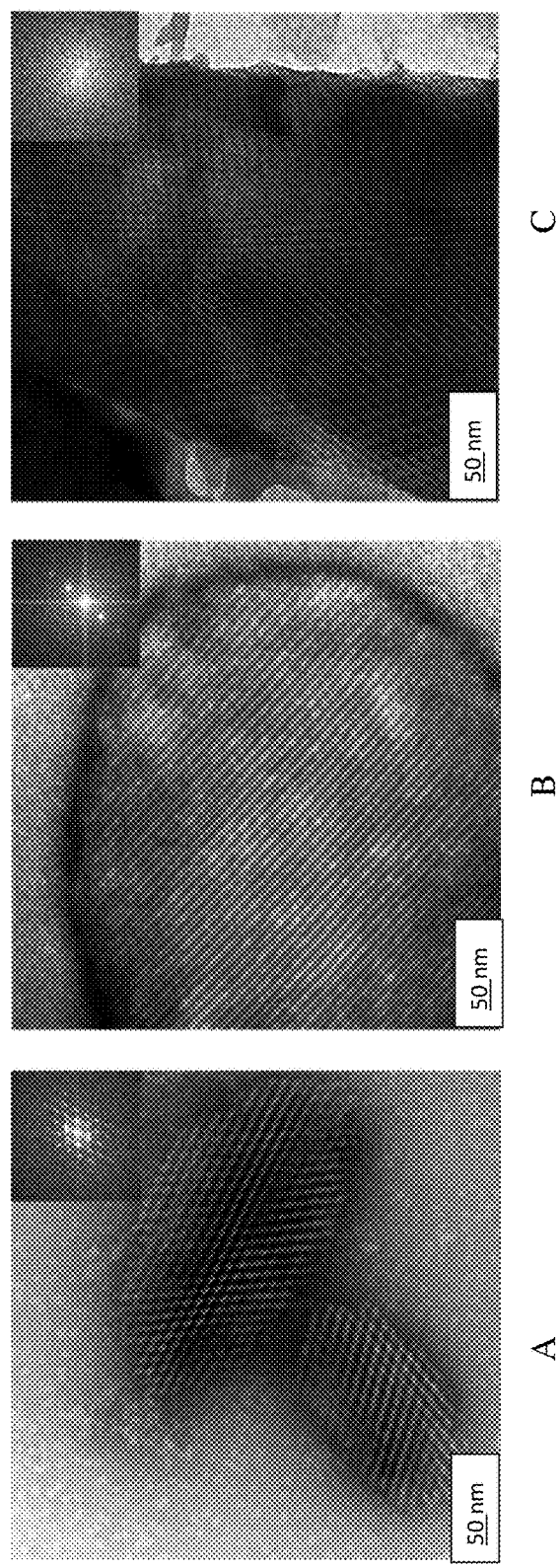
FIG. 29 provides TEM images comparing solvent content to calculated values for various proteins.
Figure 30:
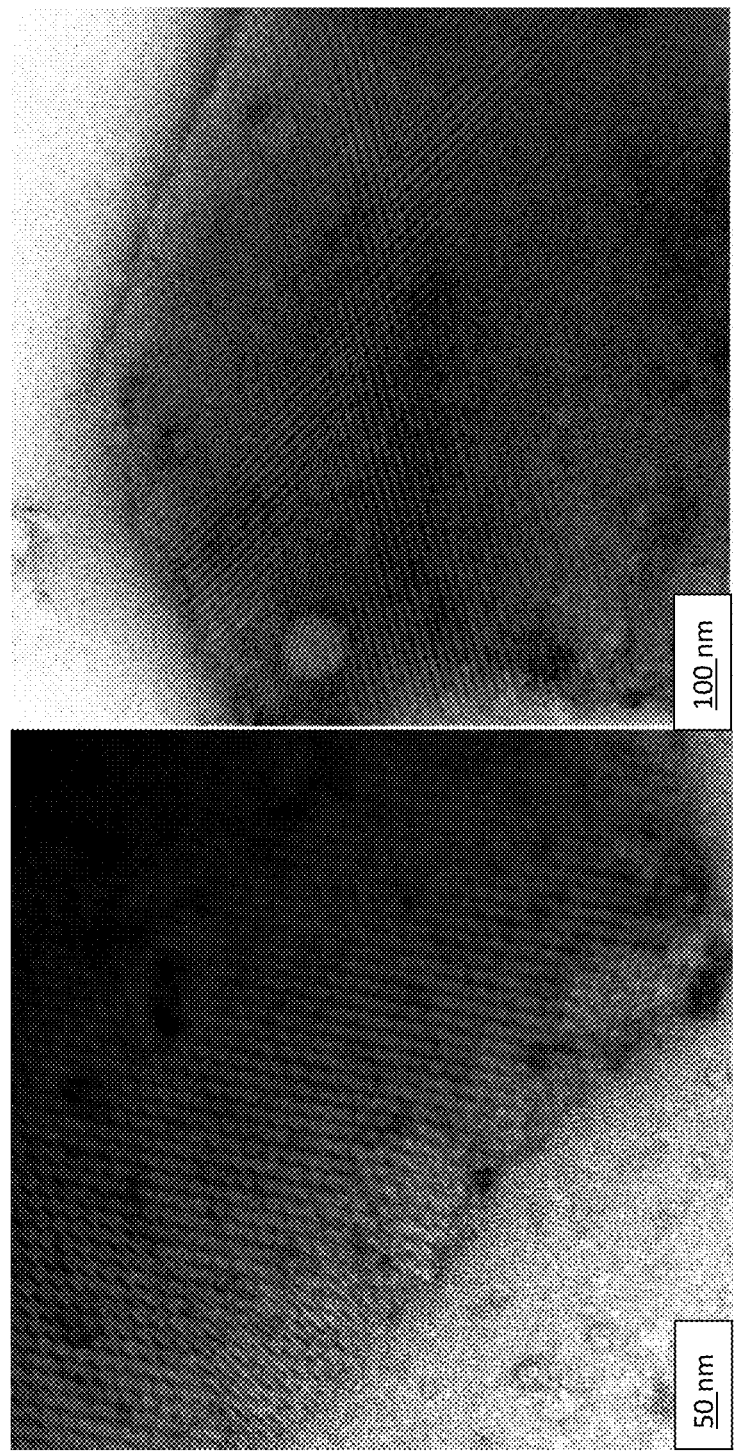
FIG. 30 provides TEM images of Delta47 nanocrystals before and after dehydration experiments with FFT in upper right corner.

In order to characterize nanoseeds, their size was identified and the presence of ordered lattices using negative-stain TEM. Nanoseeds were easily visualized on EM grids. Size and thickness of nano-seeds range from 70-2000 nm and from one to several layers (FIG. 27). FIG. 27A shows an exemplary small nano-seed on top of a background of polymerase particles. Individual sheered lattices of Pol II, and a nano-seed with clearly visible fracture lines are shown in FIGS. 27B and 27C, respectively. FIG. 27D illustrates individual polymerase particles (left), and protein filaments (middle) feeding into a small nano-seed (right). In general, nano-seed size varied with bead diameter and number, and with vortexing time. Fewer beads with larger diameters and shorter vortexing times yielded larger nano-seeds and vice versa. FIG. 28 illustrates the difference between nano-seeds generated with 0.5 mm beads and those generated by 1.0 mm beads. FIG. 28A is a TEM image of nano-seeds with single planes of lattice generated by 0.5 mm beads, and FIG. 28B is a TEM image of a nano-seed several layers thick generated by 1 mm beads. Since crystalline lattices were clearly visualized with TEM, calculating Fourier transforms from the images allowed qualitative evaluation of crystal lattices (Bragg spots). High quality lattices with three or higher order Bragg spots were evident for several samples (FIG. 27, insets). Moreover, lattice visualization allowed corroboration of the crystal's protein nature and qualitative estimation of other crystal parameters such as solvent content (FIG. 29) and defects in diffraction patterns such as anisotropy (FIG. 30). The TEM images in FIG. 29 compare the solvent content to calculated values, with wild type Pol II at 78% (FIG. 29A), TFIIF at 65% (FIG. 29B), and dGTPase at 55% (FIG. 29C). The images in FIG. 30 show Delta47 crystals after fragmentation, with FFT suggesting anisotropy (FIG. 30A), and crystals after undergoing dehydration with an isotropic FFT (FIG. 30B). These results illustrate the potential use of TEM analysis of nano-seeds as a screening method to determine crystal quality. Since the protocol described herein for nanoseed generation was highly efficient and reproducible, it constituted an important way to generate nanocrystalline material to perform cryo-electron crystallography.

Quantification of Nano-Seeds for Seeding Experiments

Figure 31:
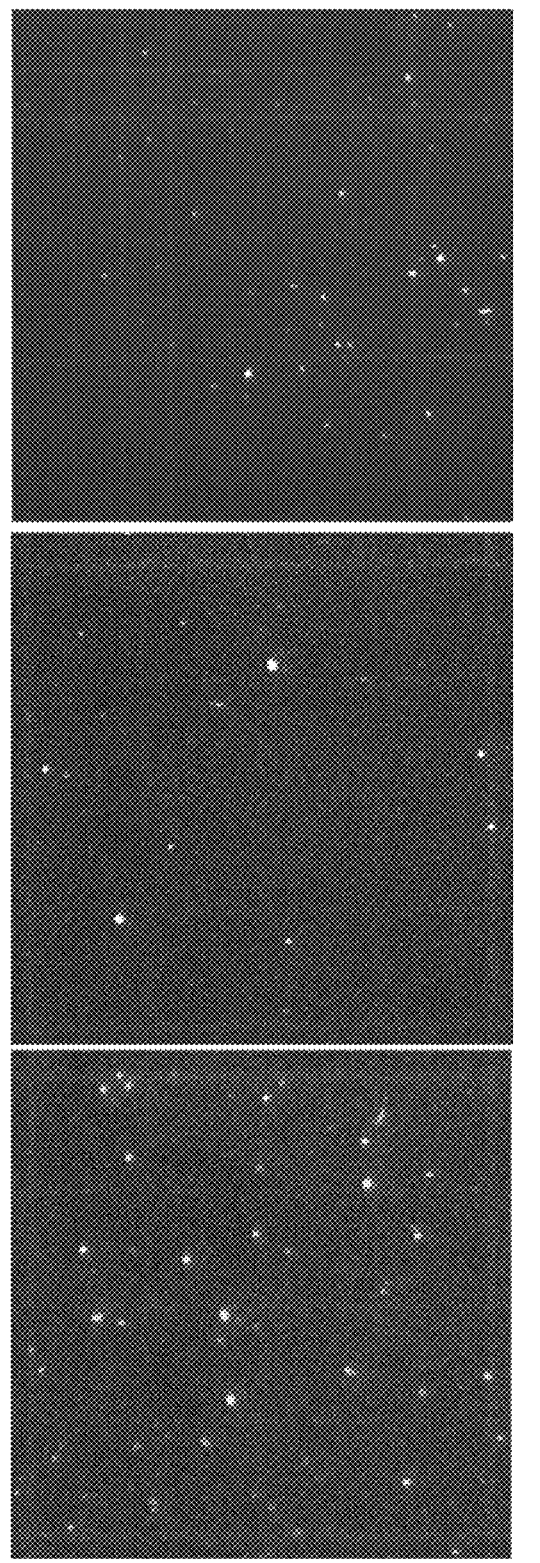
FIG. 31 provides UV tryptophan fluorescence images used for seed concentration determination.
Figure 32:
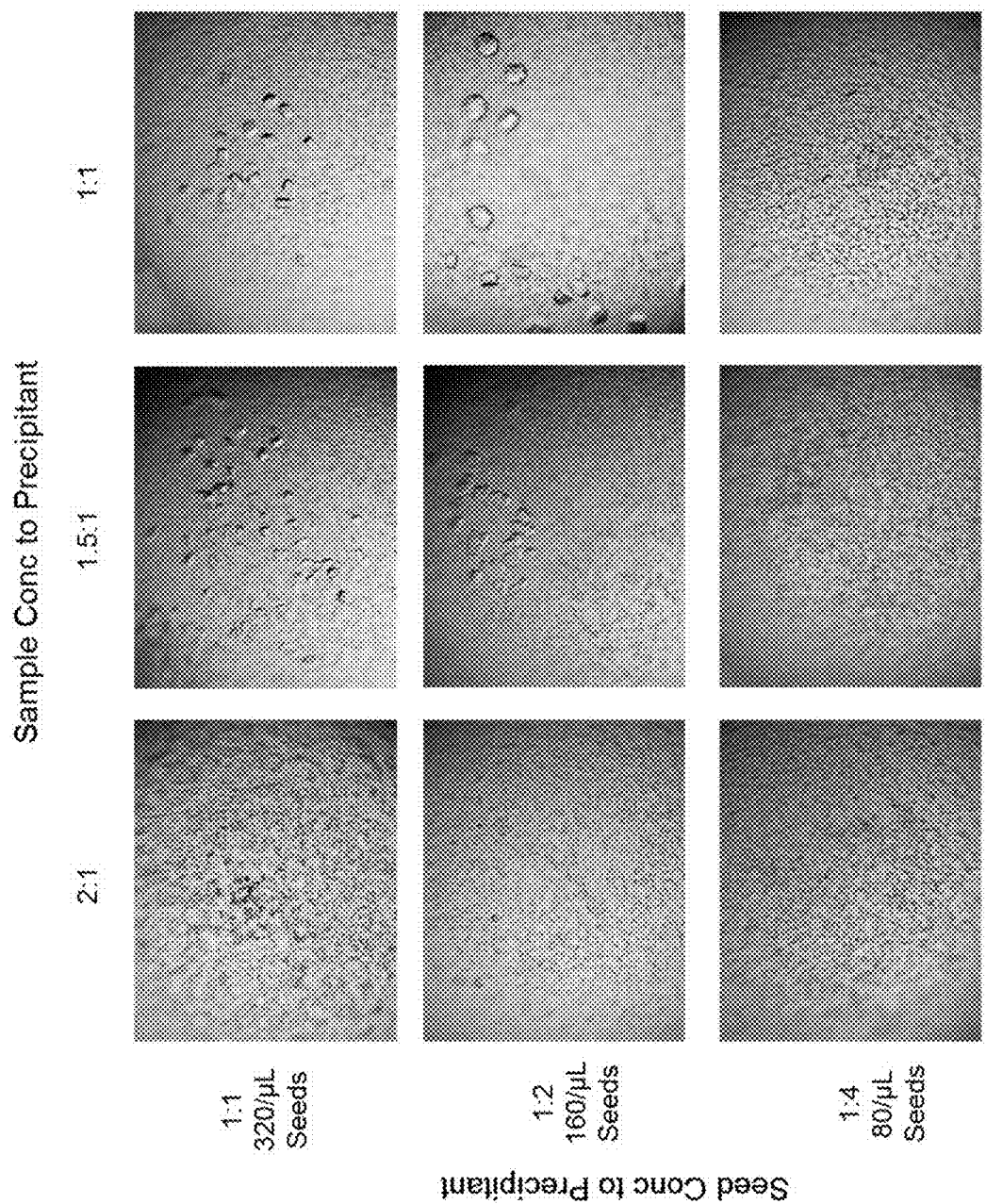
FIG. 32 is a comparison of the effect of varying the precipitant to sample ratio with the effect of quantified seed concentration.

Given the homogeneous size of nanoseeds and the fact that they are easily visualized under the UV microscope, a protocol was developed to quantify the number of nanoseeds per microliter of fragmented crystals. FIG. 31 provides UV tryptophan fluorescence images of seed concentration determination using a hemocytometer of undiluted (FIG. 31A) and 1-4 dilution of seeds (FIG. 31B). Seeds were injected into the counter chamber covered by a thin UV transparent cover slip and image was acquired for 4 seconds. Both counts yield an average of 330 seeds per μL. FIG. 31C shows a lower magnification image of hemocytometer with seeds showing the ImageJ counting overlay. The counting protocol used was consistent for each nanoseed dilution tested. Given that the ratio of seeds to protein and precipitant could be carefully monitored, nanoseed quantification allowed highly reproducible seeding experiments, since known crystal quantities could be consistently deposited on each crystal drop. Interestingly, a threshold number of nano-seeds was necessary to grow visible crystals (FIG. 32, lower and middle panels).

Nano-Seeding Experiments Using Large Crystals

Once corroborated the high quality nature of the nano-seeds, and the number of nanoseed per microliter of fragmented sample, micro-seeding experiments were performed using a nano-seed stock generated from small visible crystals (FIG. 8A). For nano-seeding experiments, conventional serial dilutions of the nano-seed stock were performed in order to fine-tune crystal size and quality. Nano-seeds were deposited on crystallization drops using a 0.3-0.4 millimeter cryo-loops (Hampton Research). "Nano-seeded" crystal drops generated high quality crystals (FIG. 16, bottom row). X-ray diffraction experiments showed overall improvement of resolution and crystal mosaicity (FIG. 16, bottom row, right panels) as expected. Moreover crystal optimization using multiple rounds of nano-seeding (sequential nano-seeding) allowed generation of large diffractable crystals, from crystals that were previously to small and low quality for x-ray diffraction. (FIG. 17 A-C).

Nano-Seeding Experiments Using Nano-Crystals

Seeding experiments were performed using nano-seeds from fragmented nano-crystals with high quality crystal lattices identified by TEM. For these samples, no serial dilutions were made since concentration of nano-seeds was typically low. For the examples presented in FIG. 16, top row, sequential nano-seeded drops generated diffracting crystals from granular precipitates.

In addition to nano-seeding being a useful initial step for obtaining higher quality crystals or simply optimizing nano-crystals into visible ones, this technique may provide a useful and reliable shortcut for arduous optimization steps for many protein crystallographic targets or at the very least significantly enhance traditional optimization approaches.

Generation of Crystal Catalogues.

Given the advances provided by X-ray diffraction experiments using free electron lasers, it is very desirable to generate high quality of homogeneous population of nano-crystals (heretofore referred as crystal catalogues) to be used for experiments at Coherent X-ray Imaging (CXI) or X-ray Pump Probe (XPP) (>20 micrometers) facilities. Initially the effects of using quantified seed dilutions on crystal growth, seeded into varying precipitant to sample dilutions, were explored. As seen in FIG. 32, there was a distinct correlation between both the precipitant to sample dilution and the quantity of seeds used dilution.

With this in mind a protocol to generate crystal catalogues consisting of finely tuned crystal sizes was developed using nano-seeds. Once nano-seeds were quantified, crystal drops were set with different ratios of volumes of protein to precipitant and seeded with equal amounts of nano-seeds from the seeding stock using a 0.3-0.4 millimeter cryo-loops (Hampton Research). As expected, all seeded drops generated collections of homogeneous crystal sizes (FIG. 19), such patterns were absent for non-seeded drops (not shown).

Discussion

Crystal seeding has been traditionally part art, part science. Low quality crystals were visually identified, crushed and used as a nucleation platform for further crystallization experiments in hopes of growing larger, higher quality crystals. However, with no way to probe the quality of these seeds and identify the best starting material, labours testing of conditions and seed dilutions were required to ultimately obtain the desired crystals.

In the method presented herein, careful pre-screening of seeding material using TEM and UV microscopy allowed for controlled seeding experiments leading to the growth of high quality crystals. The protocol used beads 0.5 to 1.0 mm in diameter to generate nano-seeds—fully fragmented crystals or crystalline granular aggregates, pre-selected by TEM. Fragmentation was nearly uniform and could be controlled by modifying parameters such as vortexing time and bead diameter or number. It was demonstrated that the fragmented crystal seeds could be quantified with a simple protocol using UV-microscopy. Seed quantification provided a way to introduce consistent numbers of crystal seeds allowing for full reproducibility of the seeding experiment.

Also included was a reproducible protocol to visualize fragmented crystals using TEM. This method allowed evaluation of critical crystal parameters such as fragment size, lattice quality and crystal solvent content. In most experiments, a direct correlation between nano-seed quality and the appearance of high quality crystals on seeded drops was easily established and corroborated by X-ray diffraction data. Applications of this fragmentation protocols might also include generation of crystals for cryo-electron crystallography and X-FEL experiments. Use of nano-seeds were extraordinary in four applications: 1) to produce improvements in crystal quality that could not be obtained through crystal condition optimization or traditional seeding. 2) Nano-crystals from granular crystalline aggregates, not visible by brightfield microscopy, only identifiable by TEM, was successfully used in seeding experiments to produce visible crystals useful for traditional x-ray crystallography. 3) To produce higher quality nano-crystals, as in traditional seeding results, improvements of which were observed by TEM. 4) Nano-seed slurries of large crystals could be used to produce homogenous sized crystals of differing sizes. These results have not only important and useful applications for traditional and nanocrystallography, but also serves as a probe into the workings of seeding, a technique which though powerful not much is known about what is occurring during the process. Furthermore, these seeds would be excellent candidates for electron diffraction experiments. Electron crystallography of three-dimensional microcrystals is a newly developing field that utilizes a diffraction tilt series on several 500-1000 nm thick crystals to capture a complete data set. The seeds produced by the fragmentation protocol described here would provide crystal fragments that would be appropriate for electron diffraction experiments circumventing the need to develop crystal growth protocols for such small crystals.

The techniques presented here offered an understanding of the working of seeding as well as a means to obtain high quality crystals. However, it also provided a way to dictate the size of crystals. A significant benefit of this technique is the ability to solve structures of crystals with a low threshold of radiation sensitivity, as the use of nano-crystals with X-FEL to determine protein structure becomes more robust. For X-FEL, large crystals often must be "optimized down" to obtain high quality nano-crystals comparable with the current setups as CXI or XPP. This can be a tedious and unpredictable process, much like optimizing small crystals into larger ones. By applying the nano-seeding method, crystal size can be fine-tuned using a standardized amount of nano-seeds, seeded into varying ratios of protein to precipitant. The results presented herein show that these experiments, when combined with nano-seed slurries, produced drops with homogenously sized crystals, which vary in size with the protein to precipitant ratio used.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method, comprising:
   contacting a plurality of beads with an aggregate comprising at least one first protein nanocrystal to form a mixture; and
   agitating the mixture to produce a nanoseed.

2. The method of claim 1, wherein the first protein nanocrystal has a diameter of less than 5 μm.

3. The method of claim 1, wherein each bead independently has a bead diameter of less than 5 mm.

4. The method of claim 3, wherein the bead diameter is selected from 0.1 mm, 0.5 mm, 1 mm or a combination thereof.

5. The method of claim 1, wherein the plurality of beads is from 2 to 1000 beads.

6. The method of claim 5, wherein the plurality of beads is from 2 to 100 beads.

7. The method of claim 6, wherein the plurality of beads is from 5 to 30 beads.

8. The method of claim 1, wherein the beads are glass beads, stainless steel beads or combinations thereof.

9. The method of claim 1, wherein the aggregate is contained within a crystallization drop.

10. The method of claim 1, wherein contacting a plurality of beads with an aggregate comprises contacting the plurality of beads with the aggregate in a microcentrifuge tube.

11. The method according to claim 1, wherein agitating the mixture comprises vortexing the mixture, shaking the mixture, stirring the mixture or any combination thereof.

12. The method of claim 11, wherein agitating the mixture comprises agitating the mixture for a time of from greater than 0 seconds to 30 seconds.

13. The method of claim 12, wherein the time is from 5 seconds to 15 seconds.

14. The method of claim 1, wherein the aggregate is a granular aggregate.

15. The method of claim 1, further comprising selecting the aggregate by brightfield microscopy, transmission electron microscopy, or a combination thereof.

16. The method of claim 15, further comprising screening the aggregate by ultraviolet tryptophan fluorescence.

17. The method of claim 1, further comprising generating a second protein nanocrystal from the nanoseed.

18. A method, comprising:
   selecting a plurality of aggregates by brightfield microscopy, each aggregate comprising at least one protein nanocrystal having a diameter of less than 5 μm;
   contacting the plurality of aggregates with a plurality of beads having a diameter of from 0.1 mm to 1 mm, to form a mixture; and
   agitating the mixture for from 5 second to 15 seconds to form a plurality of substantially homogeneous nanoseeds.

* * * * *